(12) United States Patent
Landa et al.

(10) Patent No.: US 12,179,504 B2
(45) Date of Patent: Dec. 31, 2024

(54) INTERMEDIATE TRANSFER MEMBER FOR A DIGITAL PRINTING SYSTEM

(71) Applicant: Landa Corporation Ltd., Rehovot (IL)

(72) Inventors: Benzion Landa, Nes Ziona (IL); Tomer Goral, Kadima (IL); Vitaly Burkatovsky, Rishon Lezion (IL)

(73) Assignee: LANDA CORPORATION LTD., Rehovot (IL)

( * ) Notice: Subject to any disclaimer, the term of this patent is extended or adjusted under 35 U.S.C. 154(b) by 0 days.

(21) Appl. No.: 18/492,815

(22) Filed: Oct. 24, 2023

(65) Prior Publication Data
US 2024/0116299 A1 Apr. 11, 2024

Related U.S. Application Data

(63) Continuation of application No. 17/894,172, filed on Aug. 24, 2022, now Pat. No. 11,833,847, which is a
(Continued)

(51) Int. Cl.
*B41J 3/46* (2006.01)
*B41J 2/005* (2006.01)
(Continued)

(52) U.S. Cl.
CPC .............. *B41J 3/46* (2013.01); *B41J 2/0057* (2013.01); *B41J 2/175* (2013.01); *B41J 29/393* (2013.01); *B41J 2002/012* (2013.01)

(58) Field of Classification Search
CPC ... B41J 3/46; B41J 2/0057; B41J 2/175; B41J 29/393; B41J 2002/012; B41J 2/005;
(Continued)

(56) References Cited

U.S. PATENT DOCUMENTS

| 6,151,040 A | 11/2000 | Takada et al. |
| 7,313,352 B2 | 12/2007 | Shinohara et al. |

(Continued)

FOREIGN PATENT DOCUMENTS

| DE | 102012011783 A1 | 12/2013 |
| JP | H05212851 A | 8/1993 |

(Continued)

OTHER PUBLICATIONS

Co-pending U.S. Appl. No. 18/207,180, inventor Landa; Benzion, filed on Jun. 8, 2023.
(Continued)

*Primary Examiner* — Jason S Uhlenhake
*Assistant Examiner* — Alexander D Shenderov
(74) *Attorney, Agent, or Firm* — MEITAR PATENTS LTD.

(57) ABSTRACT

A system includes: (a) a flexible intermediate transfer member (ITM) including multiple layers and markers including: (i) a structure engraved, in at least one of the layers, at respective marking locations along the ITM, and (ii) at least part of the structure is filled with a filling material that changes one or both of optical and magnetic properties of the ITM, the ITM includes an outer layer for receiving ink droplets, and transferring the ink image to a target substrate, (b) sensing assemblies disposed at respective predefined locations relative to the ITM, and configured to produce signals indicative of respective positions of the markers, and (c) a processor, which is configured to receive the signals, and based on the signals, to control a deposition of the ink droplets on the ITM, and the processor is configured to detect a deformation of the ITM based on the first and second signals.

10 Claims, 7 Drawing Sheets

Related U.S. Application Data continuation of application No. 17/252,747, filed as application No. PCT/IB2019/055288 on Jun. 24, 2019, now Pat. No. 11,465,426.

(60) Provisional application No. 62/828,501, filed on Apr. 3, 2019, provisional application No. 62/748,569, filed on Oct. 22, 2018, provisional application No. 62/715,822, filed on Aug. 8, 2018, provisional application No. 62/689,852, filed on Jun. 26, 2018.

(51) Int. Cl.
  *B41J 2/01* (2006.01)
  *B41J 2/175* (2006.01)
  *B41J 29/393* (2006.01)

(58) Field of Classification Search
  CPC ... B41J 2/01; G01D 5/34715; G01D 5/34792; B41N 10/02; B41M 5/0256; G03G 15/10; G03G 15/1685
  USPC .......................................................... 347/101
  See application file for complete search history.

(56) References Cited

U.S. PATENT DOCUMENTS

| | | | |
|---|---|---|---|
| 7,419,257 | B2 | 9/2008 | Mouri et al. |
| 7,583,920 | B2 | 9/2009 | Willemsens et al. |
| 8,632,147 | B2 | 1/2014 | Onishi |
| 9,044,932 | B2 | 6/2015 | Ohnishi et al. |
| 9,969,182 | B2 | 5/2018 | Torisaka et al. |
| 10,052,865 | B2 | 8/2018 | Goto |
| 10,336,060 | B2 | 7/2019 | Liu |
| 11,833,847 | B2 | 12/2023 | Landa et al. |
| 2006/0127617 | A1 | 6/2006 | Tanaka et al. |
| 2015/0097906 | A1 | 4/2015 | Beier et al. |
| 2017/0275113 | A1 | 9/2017 | Rietbergen et al. |
| 2018/0178550 | A1 | 6/2018 | Kremers et al. |
| 2018/0335740 | A1 | 11/2018 | Kishi et al. |
| 2022/0357699 | A1 | 11/2022 | Burkatovsky |
| 2023/0166495 | A1 | 6/2023 | Burkatovsky |
| 2023/0202162 | A1 | 6/2023 | Landa et al. |
| 2023/0202209 | A1 | 6/2023 | Guttman et al. |
| 2023/0365824 | A1 | 11/2023 | Levanon et al. |

FOREIGN PATENT DOCUMENTS

| | | |
|---|---|---|
| JP | H05249870 A | 9/1993 |
| JP | H08272224 A | 10/1996 |
| JP | 2003227549 A | 8/2003 |
| JP | 2006154289 A | 6/2006 |
| JP | 2008248437 A | 10/2008 |
| JP | 2017072776 A | 4/2017 |
| JP | 2017167498 A | 9/2017 |
| JP | 2018084617 A | 5/2018 |
| JP | 2018150660 A | 9/2018 |
| WO | 2015036865 A1 | 3/2015 |
| WO | 2017208144 A1 | 12/2017 |
| WO | 2019012456 A1 | 1/2019 |
| WO | 2019111223 A1 | 6/2019 |
| WO | 2020003088 A1 | 1/2020 |
| WO | 2020035766 A1 | 2/2020 |
| WO | 2020136517 A1 | 7/2020 |
| WO | 2020141465 A1 | 7/2020 |
| WO | 2021137063 A1 | 7/2021 |

OTHER PUBLICATIONS

DE102012011783A1 Machine Translation (by EPO, PlatPat and Google)—published Dec. 19, 2013; Heidelberger Druckmasch AG.

JP2003227549A Machine Translation (by EPO, PlatPat and Google)—published Aug. 15, 2003; Xerox Corp.

JP2008248437A Machine Translation (by EPO and Google)—published Oct. 16, 2008; Seiren Co Ltd.

JP2018150660A Machine Translation (by EPO and Google)—published Sep. 27, 2018; Seiren Co Ltd.

JPH05212851A Machine Translation (by EPO and Google)—published Aug. 24, 1993; Kanebo Ltd et al.

JPH05249870A Machine Translation (by EPO, PlatPat and Google)—published Sep. 28, 1993; Matsushita Electric Ind Co Ltd.

JPH08272224A Machine Translation (by EPO, PlatPat and Google)—published Oct. 18, 1996; Ricoh KK.

Osram Opto Semiconductors GmbH, "SFH 206 K—Radial Sidelooker—Silicon PIN Photodiode", Datasheet, Jan. 7, 2020, Version 1.4, pp. 1-14.

Siemens Semiconductor Group, "Silizium-PIN-Fotodiode—SFH 206 K," Datasheet, Mar. 17, 1998, pp. 1-4.

Vishay Intertechnology, Inc., "Power SMD LED LCC-2 Plus", Datasheet, year 2017, pp. 1-9.

JP2006154289A Machine Translation (by EPO and Google)—published Jun. 15, 2006; Ricoh KK.

JP2017072776A Machine Translation (by EPO and Google)—published Apr. 13, 2017; Oki Data KK.

JP2017167498A Machine Translation (by EPO and Google)—published Sep. 21, 2017; Ricoh Co Ltd.

JP2018084617A Machine Translation (by EPO and Google)—published May 31, 2018; Ricoh Co Ltd.

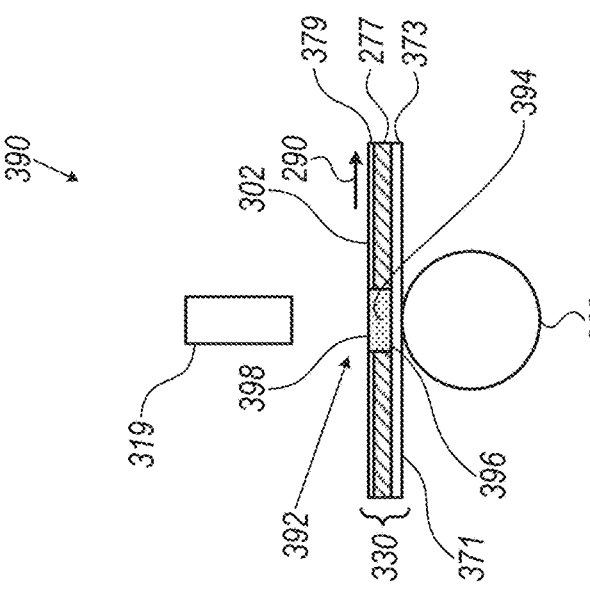
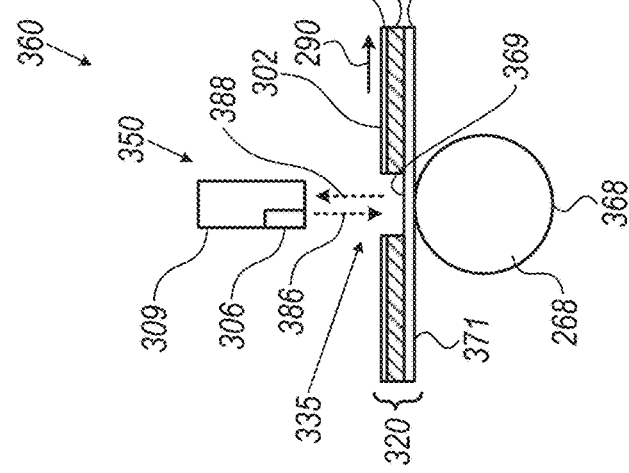
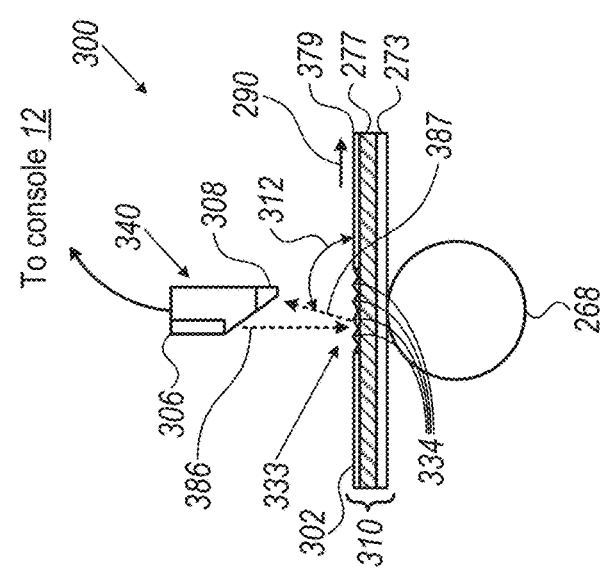

INTERMEDIATE TRANSFER MEMBER FOR A DIGITAL PRINTING SYSTEM

CROSS-REFERENCE TO RELATED APPLICATIONS

This application is a continuation of U.S. patent application Ser. No. 17/894,172, filed Aug. 24, 2022, which is a continuation of U.S. patent application Ser. No. 17/252,747, filed Dec. 16, 2020 (now U.S. Pat. No. 11,465,426), in the national phase of PCT Application PCT/IB2019/055288, filed Jun. 24, 2019, which claims the benefit of U.S. Provisional Patent Application 62/689,852, filed Jun. 26, 2018, U.S. Provisional Patent Application 62/715,822, filed Aug. 8, 2018, U.S. Provisional Patent Application 62/748,569, filed Oct. 22, 2018, and U.S. Provisional Patent Application 62/828,501, filed Apr. 3, 2019.

The disclosures of all these related applications are incorporated herein by reference.

FIELD OF THE INVENTION

The present invention relates generally to digital printing, and particularly to methods and systems for controlling the operation of digital printing systems.

BACKGROUND OF THE INVENTION

Various methods and devices for controlling processes in digital printing are known in the art.

For example, PCT Patent Application PCT/IB2013/051727 describes control apparatus and methods for a printing system, for example, comprising an intermediate transfer member (ITM). Some embodiments relate to regulation of a velocity and/or tension and/or length of the ITM. Some embodiments relate to regulation of deposition of ink on the moving ITM. Some embodiments regulate to apparatus configured to alert a user of one or more events related to operation of the ITM.

U.S. Pat. No. 5,889,534 describes a method of characterizing a drum-based digital print engine so that each of a plurality of ink droplets propelled toward a common picture element location, or pixel, of a print media coupled to an exterior surface of a rotating drum member precisely reaches the same pixel location regardless of slight variations in portions of the surface of the drum.

SUMMARY OF THE INVENTION

An embodiment of the present invention that is described herein provides a system that includes a flexible intermediate transfer member (ITM), one or more sensing assemblies, and a processor. The flexible ITM including a stack of multiple layers and having one or more markers engraved in at least one of the layers, at one or more respective marking locations along the ITM, the ITM is configured to receive ink droplets from an ink supply system to form an ink image thereon, and to transfer the ink image to a target substrate. The one or more sensing assemblies are disposed at one or more respective predefined locations relative to the ITM, and are configured to produce signals indicative of respective positions of the markers. The processor is configured to receive the signals, and, based on the signals, to control a deposition of the ink droplets on the ITM.

In some embodiments, at least one of the markers includes at least one code selected from a list consisting of: a grid marker, a motion encoding code, a one-dimensional (1D) barcode, a two-dimensional (2D) barcode, and a three-dimensional (3D) barcode. In other embodiments, the 2D barcode includes at least one of a quick response (QR) code and an AZTEC code. In yet other embodiments, at least one of the markers has a geometrical shape selected from a list consisting of a round shape, a rectangular shape, a square shape, and a star shape.

In an embodiment, the system includes one or more light sources associated respectively with at least one of the sensing assemblies, such that each light source is facing the respective sensing assembly or coupled to the respective sensor, and each of the light sources is configured to illuminate the ITM. In another embodiment, the system includes a slit assembly, which is disposed between the ITM and the sensing assembly and having first and second slits, which are formed at a predefined distance from one another and are configured to pass, through the slit assembly, one or more light beams emitted from the light source, when a given marker of the markers is aligned with the first slit, the sensing assembly is configured to produce a first signal indicative of a position of the given marker aligned with the first slit, and when the given marker is aligned with the second slit, the sensing assembly is configured to produce a second signal indicative of the position of the given marker aligned with the second slit, and the processor is configured to detect, based on the first and second signals, a deformation of the ITM.

In some embodiments, the system includes a fiber assembly, which is disposed between the slit assembly and the sensing assembly and having multiple optical fibers, which are configured to convey the light beams that pass through the slit assembly, to the sensing assembly. In other embodiments, the light beams include a first light beam passing through the first slit and a second light beam passing through the second slit, and the system including a shield, which is disposed between the first and second slits and is configured to isolate between the first and second light beams. In yet other embodiments, the markers include at least the given marker and an adjacent marker located at an inter-marker distance from the given marker, and the inter-marker distance is larger than the predefined distance.

In an embodiment, when the ITM moves at a predefined speed relative to the first and second slits, the processor is configured to detect the deformation of the ITM, based on the predefined speed and the first and second signals. In another embodiment, at least one of the light sources is configured to emit one of a visible light, an infrared (IR) light and an ultraviolet (UV) light, and at least one of the sensing assemblies is configured to sense the light emitted from the respective light sources. In yet another embodiment, at least one of the markers includes magnetic material, and at least one of the sensing assemblies is configured to sense a magnetic field produced between the magnetic material and the sensing assembly, and, based on the sensed magnetic field, to produce the signals.

In some embodiments, the system includes at least one station or assembly, the processor is configured, based on the signals, to control an operation of the at least one station or assembly of the system. In other embodiments, the at least one station or assembly is selected from a list consisting of (a) an image forming station, (b) an impression station, (c) an ITM guiding system, (d) one or more drying assemblies, (e) an ITM treatment station, and (f) an image quality control station. In yet other embodiments, the image forming station includes at least a print bar including one or more print heads, and the image forming station is coupled to the ink supply system and configured to receive the ink therefrom, and to apply the ink droplets to the ITM using the print heads.

In an embodiment, the impression station includes a rotatable impression cylinder and a rotatable pressure cylinder, configured to transfer the ink image to the target substrate, and the processor is configured, based on the signals, to control at least one operation selected from a list consisting of (a) timing of engagement and disengagement between the impression and pressure cylinders, (b) a motion profile of at least one of the impression and pressure cylinders, and (c) a size of a gap between the disengaged impression and pressure cylinders. In another embodiment, the processor is configured to control, based on the signals, a drying process applied by at least one of the drying assemblies for drying the ink droplets deposited on the ITM. In yet another embodiment, the processor is configured to control, based on the signals, a velocity of one or more rollers of the ITM guiding system.

In some embodiments, the processor is configured to control, based on the signals, at least one of a cooling process, a cleaning process and a treatment process of the ITM at the ITM treatment station. In other embodiments, the processor is configured to control, based on the signals, application of a treatment fluid on the ITM at the ITM treatment station. In yet other embodiments, the processor is configured to control, based on the signals, at least one imaging parameter of a digital image of the ink image acquired and processed by the image quality control station.

In an embodiment, the one or more markers includes a continuous marker formed along at least a portion of the ITM. In another embodiment, at least one of the markers engraved in the ITM includes filling material, which is configured to fill at least part of a structure formed in at least one of the ITM layers. In yet another embodiment, the filling material includes magnetic material that produces a magnetic field between the magnetic material and the sensing assembly.

In some embodiments, the filling material is configured to change at least one optical property of at least one of the ITM layers, or to change at least one optical property of the entire ITM. In other embodiments, the filling material includes at least one material from a list of materials consisting of: a silicone polymer, a polyurethane, a metal, a silicone-based pigment, and a magnetic material. In yet other embodiments, the filling material has at least one attribute selected from a list of attributes consisting of: chemical affinity to a silicone polymer, mechanical and chemical stability at a temperature range between 0° C. and 180° C., chemical resistance, and surface hardness larger than 30 Shore A.

In an embodiment, the stack of multiple layers includes at least a first layer and a second layer, which is disposed on the first layer, and at least one of the markers is engraved through the second layer and is extended into the first layer. In another embodiment, the stack of multiple layers includes at least a first layer and a second layer, which is disposed on the first layer, and wherein at least one of the markers is engraved into at least part of at least one of the first and second layers.

There is additionally provided, in accordance with an embodiment of the present invention, a system that includes a flexible intermediate transfer member (ITM), one or more sensing assemblies, and a processor. The flexible ITM includes (a) a stack of multiple layers, and (b) one or more markers integrated with at least one of the flexible layers at one or more respective marking locations along the ITM, the ITM is configured to receive ink droplets from an ink supply system to form an ink image thereon, and to transfer the ink image to a target substrate. The one or more sensing assemblies are disposed at one or more respective predefined locations relative to the ITM, and are configured to produce signals indicative of respective positions of the markers. The processor is configured to receive the signals, and, based on the signals, to control a deposition of the ink droplets on the ITM.

In some embodiments, the markers include one or more three-dimensional (3D) markers printed on at least one of the flexible layers.

There is further provided, in accordance with an embodiment of the present invention, a method for producing an intermediate transfer member (ITM), the method includes providing one or more layers. One or more markers are formed in at least one of the one or more layers so as to constitute an integral part thereof.

In some embodiments, providing the one or more layers includes providing at least (a) an opaque layer for attenuating intensity of light impinging thereon, and (b) a transparent layer for passing intensity of light impinging thereon. In other embodiments, forming the one or more markers includes removing at least part of the opaque layer and retaining at least part of the transparent layer. In yet other embodiments, forming the markers includes engraving at least one of the markers into at least part of at least one of the one or more layers.

There is additionally provided, in accordance with an embodiment of the present invention, an intermediate transfer member (ITM) configured for receiving ink droplets to form an ink image thereon and for transferring the ink image to a target substrate, the ITM includes one or more layers and one or more markers integrated with at least one of the one or more layers at one or more respective marking locations along the ITM.

In some embodiments, at least one of the markers engraved in the ITM includes filling material, which is configured to fill at least part of a structure formed in at least one of the ITM layers. In other embodiments, at least one of the markers includes an ink marker, which is printed on at least one of the flexible layers. In yet other embodiments, at least one of the markers includes one or more three-dimensional (3D) markers printed on at least one of the flexible layers.

In an embodiment, the one or more layers include an opaque layer, which is configured to attenuate intensity of light impinging thereon, from being transmitted therethrough, at least part of the opaque layer is removed at one or more of the respective marking locations. In another embodiment, the one or more layers include at least: (a) a non-reflective layer, which is configured to attenuate intensity of light impinging thereon, from being reflected therefrom, and (b) a transparent layer, which is configured to pass intensity of light impinging thereon. In yet another embodiment, the one or more layers include a non-reflective layer, which is configured to attenuate intensity of light impinging thereon, from being reflected therefrom, at least part of the non-reflective layer is removed at one or more of the respective marking locations.

In some embodiments, at least one of the layers is folded along a length axis and having first and second ends coupled to one another so as to form a continuous loop. In other embodiments, the continuous loop is configured to wrap around one or more rollers of an indirect printing system and to be guided by the rollers. In yet other embodiments, the ITM is configured to wrap around one or more drums of an indirect printing system. In some embodiments, at least one of the markers is engraved into at least part of at least one of the one or more layers.

In an embodiment, the continuous loop is configured to transfer the ink image to the target substrate, which is selected from a list consisting of: a sheet and a continuous web. In another embodiment, at least two of the layers are aligned with one another and have common first and second ends, and the at least two layers are folded along a length axis, and the first and second ends are coupled to one another so as to form a continuous loop. In yet another embodiment, the markers are configured to indicate an amount of stretching of the ITM.

There is additionally provided, in accordance with an embodiment of the present invention, an intermediate transfer member (ITM) configured for receiving ink droplets to form an ink image thereon and for transferring the ink image to a target substrate, the ITM includes one or more layers and one or more markers engraved in at least one of the layers at one or more respective marking locations along the ITM.

There is further provided, in accordance with an embodiment of the present invention, an intermediate transfer member (ITM), one or more sensing assemblies, and a processor. The ITM includes (a) one or more layers, and (b) one or more markers integrated into at least one of the one of more layers at one or more respective marking locations along the ITM. The ITM is configured to receive an ink image from an ink supply system, and to transfer the ink image to a target substrate. The one or more sensing assemblies are disposed at one or more respective predefined locations relative to the ITM, and are configured to produce signals indicative of respective positions of the markers. The processor is configured to receive the signals, and, based on the signals, to control a placement of the ink image on the ITM.

In some embodiments, the ITM is configured to stretch, and, based on the signals, the processor is configured to estimate an amount of stretching of the ITM.

There is additionally provided, in accordance with an embodiment of the present invention, a printing system that includes an intermediate transfer member (ITM), one or more sensing assemblies, and a processor. The ITM includes (a) one or more layers, and (b) one or more markers integrated into at least one of the one of more layers at one or more respective marking locations along the ITM, the ITM is configured to receive an image of a printing fluid from an image forming station configured to supply the printing fluid, and to transfer the image to a target substrate. The one or more sensing assemblies are disposed at one or more respective predefined locations relative to the ITM, and are configured to produce signals indicative of respective positions of the markers. The processor is configured to receive the signals, and, based on the signals, to control a placement of the image on the ITM.

In some embodiments, at least one of the one or more layers includes at least one material selected from a list consisting of a polytetrafluoroethylene, a polyester, a polyimide, a polyvinyl chloride (PVC), a polyolefin, an elastomer, a polystyrene-based polymer, a polyamide-based polymer, a methacrylate-based elastomer, a rubber, a polyurethane, a polycarbonate and an acrylic. In other embodiments, the printing fluid includes a liquid including at least one colorant. In yet other embodiments, the printing fluid includes one or more types of colorant-containing slurries.

In an embodiment, the printing fluid includes an ink. In another embodiment, the printing fluid includes a toner. In yet another embodiment, the ITM is configured to perform a process or a combination of processes selected from a list consisting of: (a) inkjet, (b) electrophotography, (c) lithography, (d) flexography, and (e) gravure.

There is further provided, in accordance with an embodiment of the present invention, an intermediate transfer member (ITM) configured for receiving ink droplets to form an ink image thereon, for transferring the ink image to a target substrate, and for moving along a continuous path, the ITM includes first and second longitudinal edges, and one or more guiding elements. The first and second longitudinal edges are extending along a longitudinal axis of the ITM. The one or more guiding elements are arranged along at least one of the first and second longitudinal edges and are configured to engage with a guiding subsystem of a printing system, so as to move the ITM along the continuous path. At least one of the guiding elements includes one or more markers positioned at one or more respective marking locations along the respective guiding element.

In some embodiments, the guiding elements include one or more lateral formations formed along the first and second longitudinal edges. The formations are configured to engage with respective guiding tracks of the guiding subsystem, so as to apply at least a longitudinal force to the ITM, and at least one of the lateral formations includes at least one of the markers. In other embodiment, at least two of the lateral formations are positioned at a predefined spacing from one another along at least one of the first and second longitudinal edges. In yet other embodiments, at least one of the guiding elements includes a zip fastener, and the lateral formations include teeth of the zip fastener.

In an embodiment, one or more of the teeth serve as the markers. In another embodiment, at least one of the teeth has a longitudinal marker dimension that is between 0.003% and 0.05% of a longitudinal ITM dimension of the ITM, and the longitudinal marker dimension and the longitudinal ITM dimension are measured along the longitudinal axis of the ITM. In yet another embodiment, the zip fastener includes more than 500 teeth, and one or more of the teeth serve as the markers.

The present invention will be more fully understood from the following detailed description of the embodiments thereof, taken together with the drawings in which:

BRIEF DESCRIPTION OF THE DRAWINGS

FIGS. 3A, 3B, and 3C are schematic side views of position sensing assemblies, in accordance with another embodiment of the present invention;

DETAILED DESCRIPTION OF EMBODIMENTS

Overview

Figure 1:
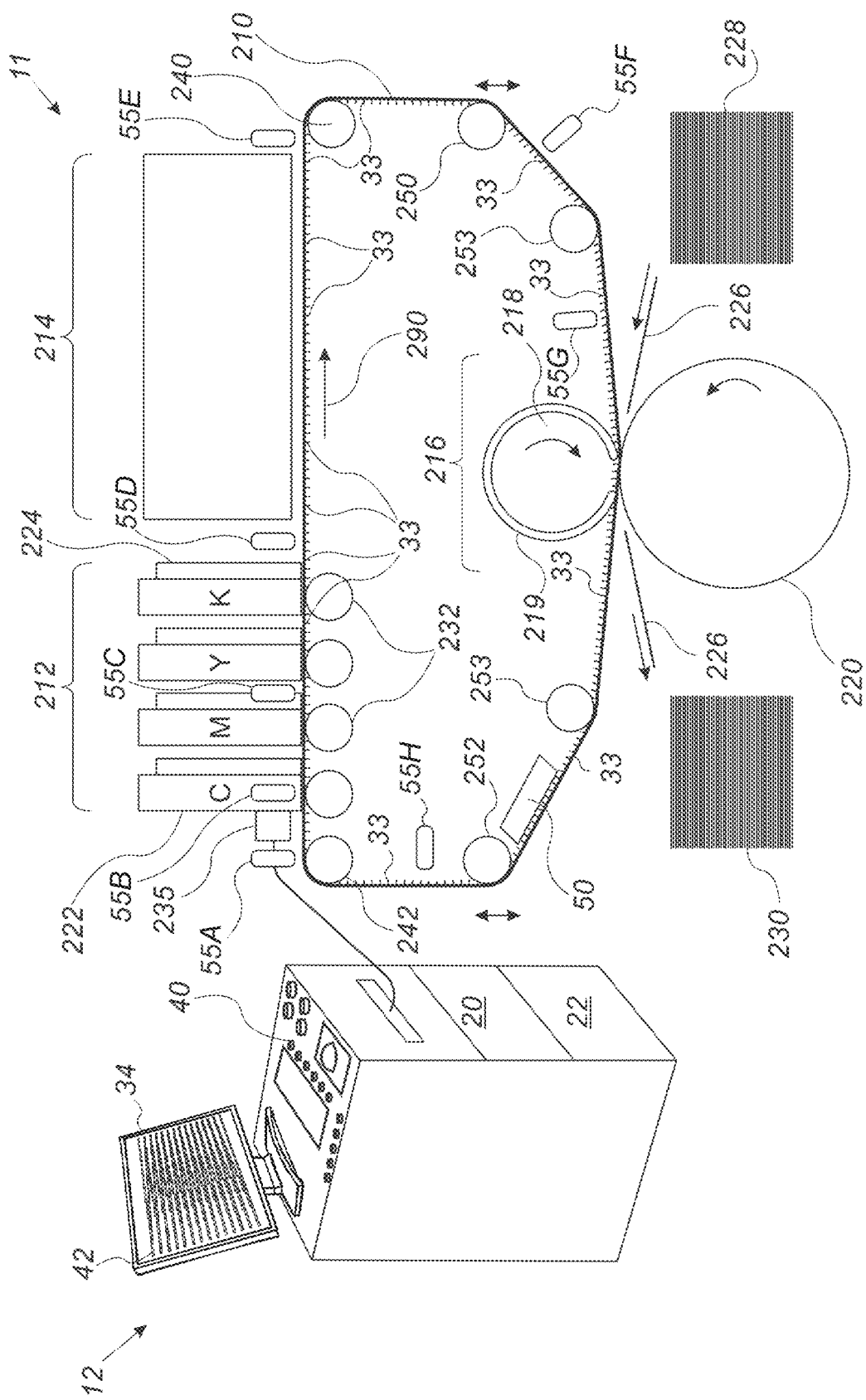
FIG. 1 is a schematic side view of a digital printing system, in accordance with an embodiment of the present invention.

Embodiments of the present invention that are described hereinbelow provide methods and apparatus for enhancing the precision of a digital printing system.

In some embodiments, the digital printing system comprises a moving flexible intermediate transfer member (ITM), also refers to herein as a blanket, and several stations, such as an image forming station, an ink drying station and an impression station, and between which the ITM rotates by means of a guiding system. The image forming station comprises a plurality of print bars configured to apply ink droplets to the ITM to form an image. The ink drying station is configured to dry the ink image applied to the ITM, and the impression station is configured to transfer the ink image from the ITM to a target substrate such as a sheet of paper or a continuous web.

The digital printing system may further comprise a blanket treatment station, at which the blanket is cleaned, cooled and treated using a treatment fluid, before returning to the image forming station.

The digital printing system further comprises a processor configured to control the operation of these stations and other components of the digital printing system. In a printing process, it is important to accurately deposit ink droplets on the ITM to precisely form an ink image, and subsequently, to transfer the ink image from the ITM to the target substrate in a precise manner. The precision of the printing process relies, among other factors, on the ability to monitor the movement and the behavior (e.g. stretching) of the ITM as precisely and continuously as possible.

In principle, it is possible to attach labels to the ITM surface, and to control the movement of the ITM using the labels, but such labels may deteriorate in time (e.g., peel-off or erode) due to high duty cycle of the ITM operation in the printing process. In the disclosed embodiments, at least some of the markers are formed in the ITM and are used for the control of the ITM.

In some embodiments, the ITM comprises an integrated encoder comprising a set of markers that may be formed during the production of the ITM using various techniques, such as forming structures in the ITM layers or on its surface, by engraving the markers, and/or jetting ink and/or printing three-dimensional (3D) structures on one or more layers of the ITM, or a combination thereof. For example, a marker may be formed by engraving a trench in the ITM surface, and subsequently, printing 3D structures in the trench.

In some embodiments, a processor of the digital printing system is configured to receive, from sensors that are mounted at one or more locations relative to the ITM, signals indicative of positions of respective encoder markers. The processor is further configured to control, based on the signals, a motion profile (e.g., speed, acceleration, and deceleration) of the ITM, by controlling rollers and dancers of the digital printing system, which are configured to move the ITM.

In some embodiments, engraving the markers in the ITM surface may be carried out using any suitable technique, such as laser marking, laser ablating, and/or direct part marking (e.g., mechanical punching and/or pinning). The engraved markers may have any suitable size and shape of footprint (e.g., round, rectangular, square, or star shapes shown in a top-view) or profile (e.g., hole, trench, or staircase shapes, shown in a sectional view).

In some embodiments, the engraved markers may be fully or partially filled with a suitable filling material, so as to provide the markers with mechanical support, and to add features to the markers of the encoder. For example, the filling materials may change the magnetic properties of the ITM by applying magnetic materials to the engraved markers and/or to the ITM surface. Alternatively or additionally, the filing materials may change the optical properties of the engraved markers and/or of the ITM surface and/or of at least one layer of the ITM, by adding various types of pigments, e.g., to the filling materials.

In some embodiments, the encoder may comprise various types of encoded structures that may serve as markers, such as grid markers, quick response (QR) codes, AZTEC codes, or a combination thereof. These markers may be sensed using any suitable type of sensors, such as optical-based sensors (e.g., visible light, infrared, ultraviolet) or magnetic-based sensors.

In some embodiments, one or more encoders are typically located at the bevels of the ITM and may comprise various types of markers, interleaved with one another along the ITM. Additionally, or alternatively, markers of different types may be grouped at different respective locations of the ITM.

The disclosed techniques improve the quality of printed images by accurately controlling a plurality of operations of the digital printing system, such as the deposition of ink droplets on the ITM so as to form the ink image, the drying of the ink droplets, the transfer of the ink image from the ITM to a target substrate and the treatment of the ITM before returning to the image forming station. The disclosed technique may be used to reduce the complexity of the digital printing system, for example, by reducing the need to integrate rotary encoders to the rollers. Moreover, the disclosed encoders are designed and produced to demonstrate high endurance even at high duty cycles typically used in digital printing systems.

System Description

FIG. 1 is a schematic side view of a digital printing system 11, in accordance with an embodiment of the present invention. In some embodiments, system 11 comprises a rolling flexible blanket 210 that cycles through an image forming station 212, a drying station 214, an impression station 216 and a blanket treatment station 50. In the context of the present invention and in the claims, the terms "blanket" and "intermediate transfer member (ITM)" are used interchangeably and refer to a flexible member comprising a stack of layers used as an intermediate member configured to receive an ink image and to transfer the ink image to a target substrate, as will be described in detail below.

In some embodiments, image forming station 212 is configured to supply various types of printing fluids, such as any suitable type of ink (e.g. inkjet ink), and/or liquid toner and/or colorant-containing slurries, and other liquids that include at least one colorant. The description below refers to aqueous ink but is also applicable for any other type of printing fluid.

In an operative mode, image forming station 212 is configured to form a mirror ink image, also referred to herein as "an ink image" (not shown), of a digital image 42 on an upper run of a surface of blanket 210. Subsequently the ink image is transferred to a target substrate, (e.g., a paper, a folding carton, or any suitable flexible package in a form of sheets or continuous web) located under a lower run of blanket 210.

In the context of the present invention, the term "run" refers to a length or segment of blanket 210 between any two given rollers over which blanket 210 is guided.

In some embodiments, during installation blanket 210 may be adhered edge to edge to form a continuous blanket loop (not shown) by soldering, gluing, taping (e.g. using Kapton® tape, Room-Temperature-Vulcanizing silicone (RTV) liquid adhesives or thermoplastic adhesives with a connective strip overlapping both edges of the strip), or using any other suitable method. Any method of joining the ends of blanket 210 may cause a discontinuity, referred to herein as a seam, and it is desirable to avoid an increase in the thickness or discontinuity of chemical and/or mechanical properties of blanket 210 at the seam. One example of a method and a system for the installation of the seam is described in detail in U.S. Provisional Application 62/532,400, whose disclosure is incorporated herein by reference.

In some embodiments, image forming station 212 comprises four separate print bars 222, connected to an ink supply system, each of which is configured to deposit one of four different colors, such as cyan (C), magenta (M), yellow (Y) and black (K). In other embodiments, station 212 may comprise any suitable number of print bars 222 arranged in station 212 at any suitable configuration and spacing therebetween. The ink supply system further comprises multiple ink reservoirs (not shown) configured to supply the cyan (C), magenta (M), yellow (Y) and black (K) aqueous ink to print bars 222. In other embodiments, the ink supply system may comprise more than one ink reservoir for each color, and optionally additional ink reservoirs for additional colors not mentioned above.

In some embodiments, each of print bars 222 incorporates one or more print heads configured to jet ink droplets of different colors onto the surface of blanket 210 so as to form the ink image (not shown) on the surface of blanket 210.

In some embodiments, print bars 222 are configured to deposit different shades of the same color, such as various shades of gray including black, or for two or more print bars 222 to deposit the same color, e.g., black.

In some embodiments, system 11 may comprise drying stations 224 that may be located between print bars 222 also referred to herein as intermediate drying stations (not shown) and/or after image forming station 212 as shown in FIG. 1. Drying stations 224 are configured to blow hot air (or another gas) onto the surface of blanket 210, so as to partially dry the ink image that is being formed.

This hot air flow between the print bars may assist, for example, in reducing condensation at the surface of the print heads and/or handling satellites (e.g., residues or small droplets distributed around the main ink droplet), and/or in preventing blockage of the inkjet nozzles of the print heads, and also prevents the droplets of different color inks on blanket 210 from undesirably merging into one another. In some embodiments, each print bar 222 is configured to jet one or more droplets of the same color at a given location on blanket 210, so as to control the level of printed color at the given location. For example, one droplet of black ink may result in light grey printed color, whereas three droplets of black ink deposited on blanket 210 may result in dark grey or black color at the given location.

In drying station 214, the ink image formed on blanket 210 is exposed to radiation and/or hot air in order to dry the ink more thoroughly, evaporating most of the liquid carrier and leaving behind only a layer of resin and coloring agent which is heated to the point of being rendered tacky.

In impression station 216, blanket 210 passes between an impression cylinder 220 and a pressure cylinder 218, which is configured to carry a compressible blanket 219.

In some embodiments, system 11 comprises a control console 12, which is configured to control multiple stations and other components of system 11, such as the motion of blanket 210, image forming station 212, and other components described herein. In some embodiments, console 12 comprises a processor 20, typically a general-purpose processor, with suitable front end and interface circuits for controlling, for example, the motion of blanket 210 and station 212, and for receiving signals therefrom. In some embodiments, processor 20 may be programmed in software to carry out the functions that are used by the printing system, and the processor stores data for the software in a memory 22. The software may be downloaded to processor 20 in electronic form, over a network, for example, or it may be provided on non-transitory tangible media, such as optical, magnetic or electronic memory media.

In some embodiments, console 12 comprises a display 34, which is configured to display data and images received from processor 20, or inputs inserted by a user (not shown) using input devices 40 of system 10. In some embodiments, console 12 may have any other suitable configuration, for example, an alternative configuration of console 12 and display 34 is described in detail in U.S. Pat. No. 9,229,664, whose disclosure is incorporated herein by reference.

In some embodiments, processor 20 is configured to display on display 34, digital image 42 comprising one or more segments of a pattern of an image stored in memory 22. The pattern is stored in one or more digital files for defining characteristics of the image to be printed by system 11.

In some embodiments, system 11 comprises one or more electrical distribution boards 235, configured to electrically connect between console 12 and all the components, modules and stations of system 11. It will be understood that the configurations of the electrical cabling and routing of system 11 are simplified and depicted purely by way of example, and other suitable configurations can also be used.

In some embodiments, blanket treatment station 50, also referred to herein as a cooling station, is configured to treat the blanket by, for example, cooling it and/or applying a treatment fluid to the outer surface of blanket 210, and/or cleaning the outer surface of blanket 210. At blanket treatment station 50 the temperature of blanket 210 can be reduced to a desired value before blanket 210 enters image forming station 212. The treatment may be carried out by passing blanket 210 over one or more rollers or blades configured for applying cooling and/or cleaning and/or treatment fluid on the outer surface of the blanket. In some embodiments, the processor 20 is configured to receive, e.g., from temperature sensors (not shown), signals indicative of the surface temperature of blanket 210, so as to monitor the temperature of blanket 210 and to control the operation of blanket treatment station 50. Examples of such treatment stations are described, for example, in PCT International Publications WO 2013/132424 and WO 2017/208152, whose disclosures are all incorporated herein by reference.

In the example of FIG. 1, station 50 is mounted between rollers 252 and 253, yet, station 50 may be mounted adjacent to blanket 50 at any other suitable location between impression station 216 and image forming station 212.

Sheets 226 or continuous web (not shown) are carried by a suitable transport mechanism (not shown) from a supply stack 228 and passed through a nip located between impression cylinder 220 and pressure cylinder 218. Within the nip, the surface of blanket 210 carrying the ink image is pressed firmly by compressible blanket 219 of pressure cylinder 218 against sheet 226 (or other suitable substrate) so that the ink image is impressed onto the surface of sheet 226 and separated neatly from the surface of blanket 210. Subsequently, sheet 226 is transported to an output stack 230.

In some embodiments, print bars 222 are positioned at predefined spacing from one another along a movement axis of blanket 210, represented by an arrow 290. In some embodiments, system 11 further comprises various types of rollers, such as rollers 232, 240, 242 and 253. In an embodiment, at least some of these rollers are controlled by processor 20 of console 12, so as to enable movement of blanket 210 at a desired (typically constant) speed below image forming station 212. Note that unsmooth or vibrating movement of blanket 210 may affect deposition of the ink image comprising one or more of the colors, and typically affect the accuracy of color-to-color registration.

In some embodiments, system 11 comprises two powered tensioning rollers, also referred to as dancers 250 and 252. Dancers 250 and 252 are configured to control the length of slack in blanket 210 before and after the nip and their movement is schematically represented by double sided arrows adjacent to the respective dancers. Furthermore, any stretching of blanket 210 with aging would not affect the ink image placement performance of system 11 and would merely require the taking up of more slack by tensioning dancers 250 and 252.

In some embodiments, a rotary encoder (shown for example in FIG. 2A below) is incorporated into at least one of rollers 232, 240, 242 and 253, and dancers 250 and 252. The rotary encoder is configured to produce rotary-based position signals indicative of an angular displacement of the respective roller or dancer.

The configuration and operation of rollers 232, 240, 242 and 253, and dancers 250 and 252 are described in further detail, for example, in U.S. Patent Application Publication 2017/0008272 and in the above-mentioned PCT International Publication WO 2013/132424, whose disclosures are all incorporated herein by reference.

In some embodiments, blanket 210 comprises an encoder comprising one or more markers 33 formed (e.g., engraved) along the blanket as shown schematically in FIG. 1 and depicted in several embodiments in FIGS. 2-7 below. Note that markers 33 may be distributed over blanket 210 in any suitable configuration or embedded within one or more of the blanket layers, as described below. Furthermore, the encoder may comprise, instead of or in addition to markers 33, at least one continuous marker (not shown) formed along at least a portion of blanket 210. The continuous marker may be produced, for example, by jetting ink on top of, or between, the layers of blanket 210, or by using any other suitable technique as will be described in detail below.

In some embodiments, system 11 further comprises multiple sensing assemblies such as, for example, eight sensing assemblies 55A . . . 55H in the figure, disposed at one or more respective predefined locations adjacent to blanket 210. The sensing assemblies are configured to produce, in response to sensing markers 33, electrical signals, such as position signals indicative of respective positions of markers 33. In the example configuration of FIG. 1, sensing assembly 55A is disposed above roller 242 so as to produce position signals indicative of respective positions of markers 33 engraved at a given section of moving blanket 210 before the given section moves below image forming station 212. In the context of the present invention and in the claims, the term "signals" may refer to various types of electrical signals, such as position signals, sensed by the sensing assemblies.

In some embodiments, sensing assembly 55B may be coupled to cyan (and/or any other) print bar 222 labeled 'C', sensing assembly 55C disposed between print bars 222 labeled 'M' and 'K', sensing assemblies 55D and 55E are respectively positioned before and after drying station 214, and sensing assemblies 55F-55H are fixed at various positions adjacent to the lower run of blanket 210. In other embodiments, system 11 may comprise any other suitable number of sensing assemblies 55 fixed at any suitable positions adjacent to blanket 210.

In some embodiments, one or more similar or different sensing assemblies may be associated with one or more of the stations along printing system 11, e.g. image formation station 212, drying station 214, impression station 216, blanket treatment station 50, and other station of system 11, and can be located at any locations adjacent to these stations allowing to produce signals as mentioned above.

In some embodiments, sensing assemblies 55A-55H are configured to produce signals indicative of the position of each marker 33 corresponding to incremental motion of blanket 210. In an embodiment, sensing assemblies 55A-55H are electrically connected to processor 20, which is configured to receive these position signals, and based on the position signals, to control several processes, such as the motion of blanket 210.

In some embodiments, the signals received from sensing assemblies 55A-55H may be used for controlling various stations and modules of system 11. For example, in station 212, these signals may be used for setting the timing or time sequences of the ink droplets jetting, and the waveform that sets the profile of the jetting from each print head of print bars 222. In the drying process, the signals received from sensing assemblies 55A-55H may be used, for example, for setting the temperature and airflow of the intermediate and drying stations 214.

In some embodiments, the signals received from sensing assemblies 55A-55H may be used for controlling processes of impression station 216, for example, for controlling the timing of the engagement and disengagement of cylinders 218 and 220 and their respective motion profiles, for controlling a size of a gap between cylinders 218 and 220, for synchronizing the operation of impression station 216 with respect to the location the blanket seam, and for controlling any other suitable operation of station 216.

In some embodiments, the signals received from sensing assemblies 55A-55H may be used for controlling the operation of blanket treatment station 50 such as for controlling the cleaning process, and/or the application of the treatment liquid to blanket 210, and for controlling every other aspect of the blanket treatment process.

Moreover, the signals received from sensing assemblies 55A-55H may be used for controlling the operation of all the rollers and dancers of system 11, each roller individually and synchronized with one another, to control any sub-system of system 11 that controls temperature aspects, and heat exchanging aspects of the operation of system 11. In some embodiments, the signals received from sensing assemblies 55A-55H may be used for controlling blanket imaging operations of system 11. For example, based on data obtained from an image quality control station (not shown) configured to acquire digital images of the image printed on the target substrate, for controlling the operation of any other component of system 11.

In the example of FIG. 1, rollers 232 are positioned at the upper run of blanket 210 and are configured to maintain blanket 210 taut when passing adjacent to image forming station 212. Furthermore, it is particularly important to control the speed of blanket 210 below image forming station 212 so as to obtain accurate jetting and deposition of the ink droplets, thereby placement of the ink image, by forming station 212, on the surface of blanket 210.

In some embodiments, impression cylinder 220 is periodically engaged to and disengaged from blanket 210 to transfer the ink images from moving blanket 210 to the target substrate passing between blanket 210 and impression cylinder 220. In some embodiments, the periodic engagements induce mechanical vibrations within slack portions in the lower run of blanket 210. System 11 is configured to apply torque to blanket 210 using the aforementioned rollers and dancers, so as to maintain the upper run taut and to substantially isolate the upper run of blanket 210 from being affected by the mechanical vibrations in the lower run.

In some embodiments, based on the position signals received from sensing assemblies 55A-55H, processor 20 is configured to control the torque applied to blanket 210 by each roller and dancer, so as to maintain the upper run of blanket 210 taut and isolated from being affected by the mechanical vibrations at the lower run. For example, drying station 214 applies radiation and/or hot air to blanket 210, so as to dry the ink image formed by image forming station 212. In some cases the applied radiation and/or hot air may cause thermal expansion of blanket 210 when passing under drying station 214. In some embodiments, processor 20 is configured to receive an indication of the thermal expansion based on the position signals produced by sensing assemblies 55D and 55E located before and after station 214. Based on the position signals sensed by sensing assemblies 55D and 55E, processor 20 is configured to set the torque level at rollers 240, 232 and 242 so as to maintain blanket 210 taut and moving at a specified speed under image forming station 212 and drying station 214.

In another embodiment, based on position signals received from sensing assemblies 55G and 55F, processor 20 is configured to set the torque levels applied to blanket 210 by dancers 250 and 252 and by rollers 253, so as to maintain blanket 210 taut and moving in accordance with a specified motion profile (e.g., speed, acceleration and deceleration) in impression station 216 and in other rollers guiding blanket 210. Note that processor 20 is configured to coordinate between the motion profiles of cylinders 218 and 220, and also to control the engagement and disengagement carried out therebetween.

In some embodiments, processor 20 is further configured to synchronize between the operation of print bars 222 directing the ink droplets, and the actual instantaneous speed at which blanket 210 moves below image forming station 212, based on the position signals received from sensing assemblies 55A-55D, so as to enable correct deposition of the ink image on the surface of blanket 210.

In some embodiments, processor 20 is further configured to control additional process steps that are carried out during the digital printing process by several stations and modules of system 11. For example, controlling the process of jetting ink droplets by image forming station 212, controlling the operation of drying station 214 so as to dry the ink image by applying to blanket 210 suitable amount of heat at precise timing, controlling the blanket treatment station configured to apply a treatment fluid to blanket 210, controlling the operation of impression cylinder 220 and pressure cylinder 218 so as to enable precise transfer of the ink image from blanket 210 to a respective sheet 226.

In the example of FIG. 1, sensing assemblies 55A-55F are mounted externally to a loop formed by blanket 210, and sensing assemblies 55G and 55H are mounted internally to the loop. This configuration is provided by way of example, so as to show two different types of sensing assemblies 55 depicted in detail in FIGS. 2A-2C and 3A-3C below. In other exemplary configurations, system 11 may comprise any suitable number of different types of sensing assemblies. The sensing assemblies may be mounted adjacent to blanket 210 at any suitable configuration.

The configuration of system 11 is simplified and provided purely by way of example for the sake of clarifying the present invention. The components, modules and stations described in printing system 11 hereinabove and additional components and configurations are described in detail, for example, in U.S. Pat. Nos. 9,327,496 and 9,186,884, in PCT International Publications WO 2013/132438, WO 2013/132424 and WO 2017/208152, in U.S. Patent Application Publications 2015/0118503 and 2017/0008272, whose disclosures are all incorporated herein by reference.

In some embodiments, the signals received from sensing assemblies 55A-55H may be used for controlling the operation of stations, modules and components of other configurations of digital printing systems using any suitable type of ITM to carry out digital printing processes. For example, for controlling systems configured to print on a continuous web, and systems configured to print on both sides of the sheet, also referred to as duplex printing systems. These web printing and duplex printing systems may comprise, additionally or alternatively to the configuration of system 11, various modules and stations, such as multiple impression stations 216 and different configurations of rollers and dancers. Exemplary modules and stations of such web printing and duplex printing systems are described in detail, for example, in PCT International Publication WO2013/132424 and in U.S. Patent Application Publication 2015/0054865, whose disclosures are all incorporated herein by reference.

In other embodiments, image forming station 212 is configured to apply the printing fluid (e.g., ink, toner) by jetting droplets as described above, or using any other suitable indirect printing technique. For example, image forming station 212 may comprise a photo charging station configured to apply an electrostatic charge image representing the image to be printed, and one or more colors of printing fluids that comprise electrically charged particles that attract to the opposing electrical fields applied to the surface of a transfer member (e.g. blanket 210 or a drum). Subsequently, the transfer member is configured to transfer the image to sheet 226 or to any other target substrate as described above.

The particular configurations of system 11 is shown by way of example, in order to illustrate certain problems that are addressed by embodiments of the present invention and to demonstrate the application of these embodiments in enhancing the performance of such systems. Embodiments of the present invention, however, are by no means limited to this specific sort of example systems, and the principles described herein may similarly be applied to any other sorts of printing systems that are known in the art, in particular printing systems using an intermediate transfer member, i.e. indirect printing systems which use, for example, a blanket or a drum to transfer the image to be printed, offset printing systems (e.g. using lithography, flexography, and gravure techniques), digital printing systems (i.e. inkjet and electrophotography), or any combination of such systems. In some embodiments, the ITM is configured to perform a process or a combination of processes, such as but not limited to inkjet, electrophotography, lithography, flexography and gravure. In these embodiments, the printing system may comprise any type of an offset printing system (e.g., using lithography, and/or flexography and/or gravure processes), or any type of a digital printing system (e.g., using inkjet and/or electrophotography processes), or any combination thereof.

Figure 2C:
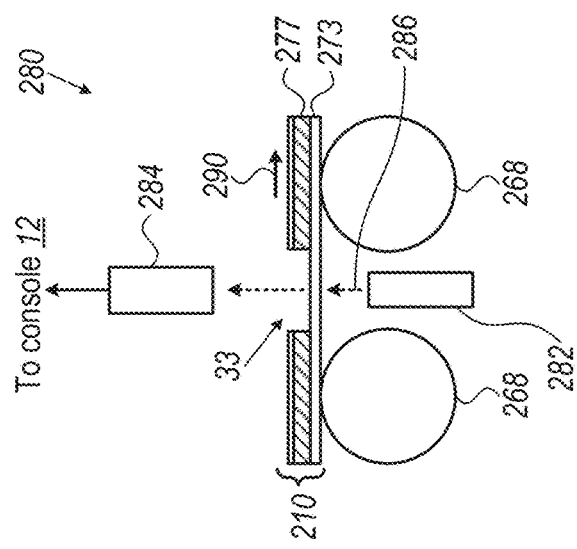
FIGS. 2A, 2B, and 2C are schematic side views of position sensing assemblies, in accordance with an embodiment of the present invention.
Figure 2B:
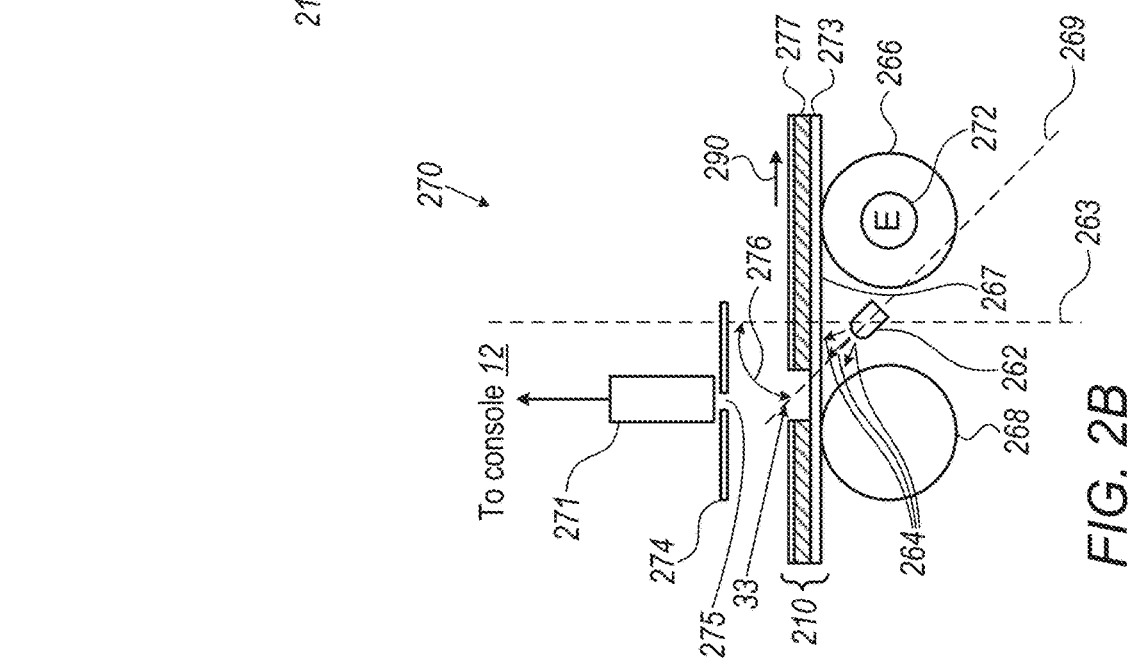
Figure 2A:
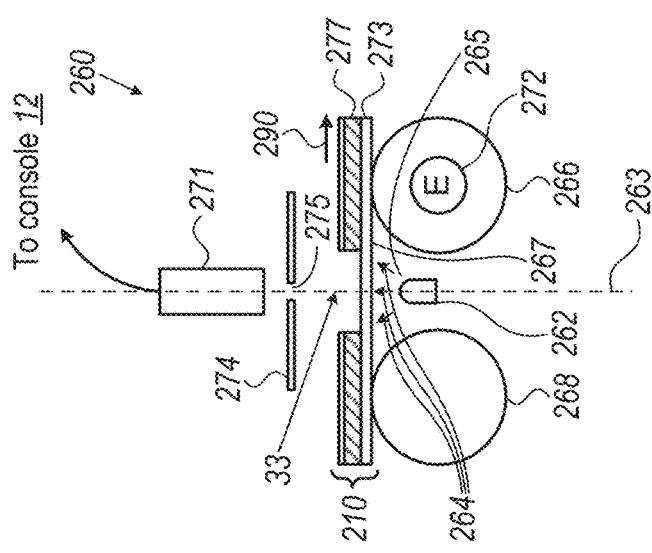

Producing Signals Indicative of Respective Positions of Markers Integrated into the Blanket FIG. 2A is a schematic side view of a position sensing assembly 260, in accordance with an embodiment of the present invention. In some embodiments, assembly 260 may replace, for example, any sensing assembly among sensing assemblies 55A-55H of FIG. 1 above. As described in FIG. 1 above, blanket 210 comprises multiple markers 33, which may be formed in blanket 210 and constitute an integral part thereof using any suitable processing technique.

In some embodiments, blanket 210 comprises multiple layers, such as a layer 273, which may be transparent to at least some wavelengths of light, and a layer 277, which is typically opaque to light. In the context of the present invention and in the claims, the term "opaque layer" refers to a layer adapted to attenuate substantial intensity of light impinging thereon, from being transmitted therethrough.

Furthermore, in the context of the present invention, the term "transparent layer" refers to a layer adapted to pass substantial intensity of the light impinging thereon, and the term "non-reflective layer" refers to a layer adapted to attenuate substantial intensity of the impinging thereon from being reflected therefrom. It will be understood that the opaqueness, transparency and reflectivity properties of a layer depend on various parameters, such as layer thickness and the wavelength of the light impinging on the respective layer.

Figure 6:
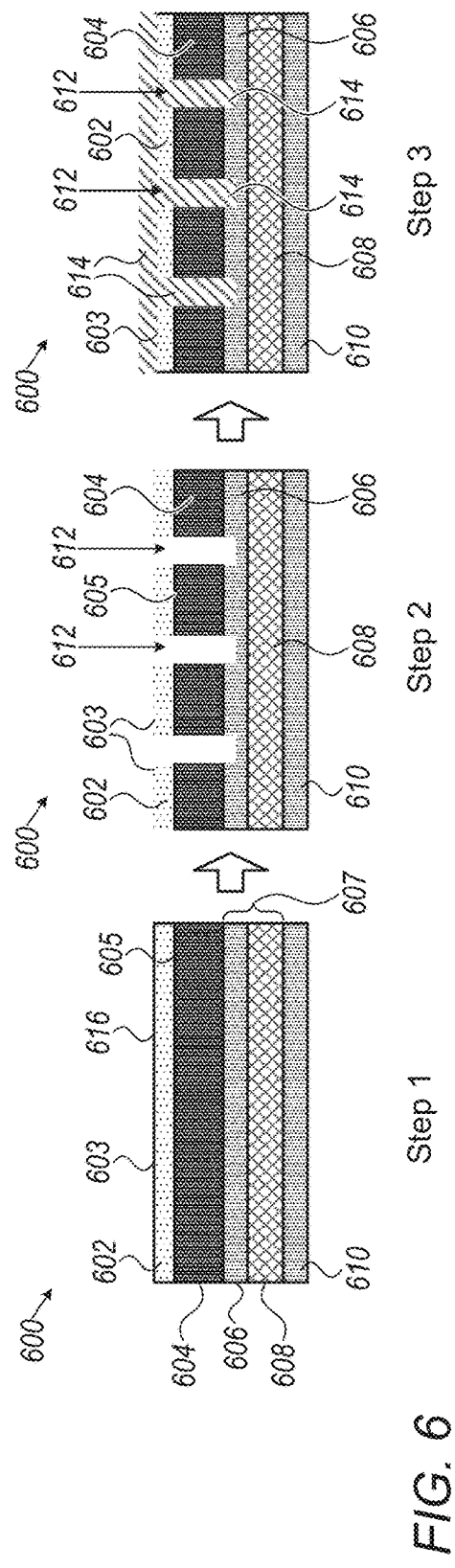
FIGS. 6 and 7 are schematic sectional views of process sequences for producing markers in a blanket of a digital printing system, in accordance with several embodiments of the present invention.
Figure 7:
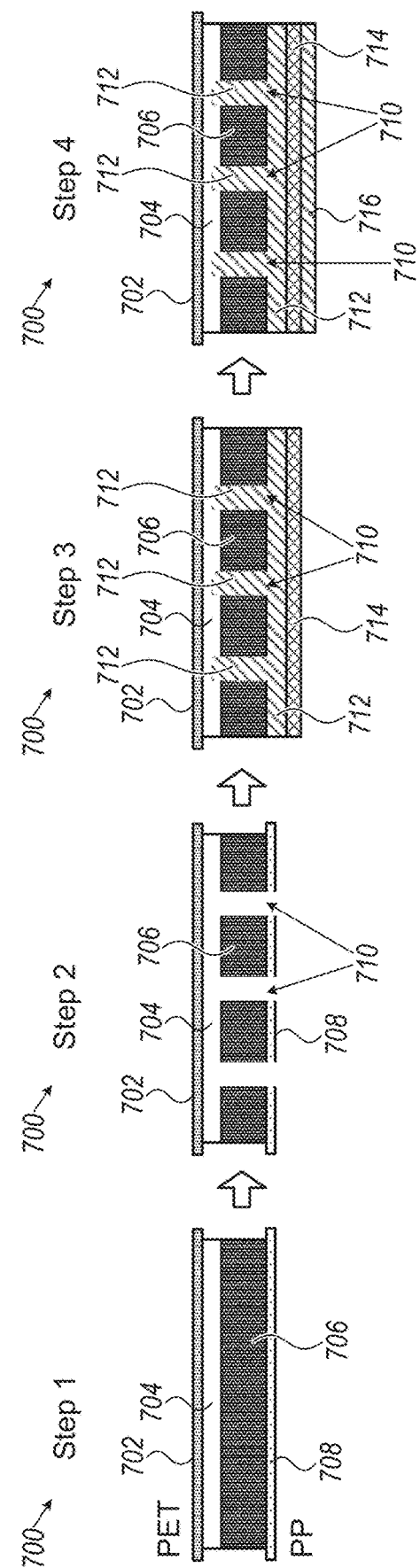

Detailed embodiments related to structures of the stacked layers of any suitable blanket, such as blanket 210, are provided for example, in FIGS. 6 and 7 of the present invention, and in PCT International Publications WO 2017/208144, whose disclosure is incorporated herein by reference.

In some embodiments, marker 33 may be formed by engraving blanket 210 at intended locations, also referred to herein as marking locations, at one or more of the blanket layers, at any suitable stage of the blanket production process, such that at least opaque layer 277 is partially removed and at least one transparent layer, such as layer 273, is remained in the stack.

The engraved configuration of marker 33 allows passage of at least a portion of light, whereas the sections of blanket 210 having at least one opaque layer are configured to block the light from reaching sensing assembly 260 or any other suitable light sensing assembly.

In these embodiments, marker 33 may be produced using any suitable process, such as but not limited to, laser marking, laser ablating, laser engraving, direct part marking (DPM) using punching or pinning techniques, ink-jetting, three-dimensional (3D) printing, disposing magnetic materials, forming a mixture of magnetic pigments in the stack of layers, or any other suitable processing technique. In some embodiments, the surface of marker 33 may be further processed so as to form different levels of surface roughness and textures, using any suitable technique, such as but not limited to mechanical processing, chemical processing, and laser processing, e.g., thermal ablation.

Note that using one or more of the above techniques, enables the formation of an encoder integrated with the structure of blanket 210, e.g., by removing opaque layers from blanket 210, by disposing suitable material between the layers of blanket 210, and/or by disposing material (e.g., ink-jetting, 3D printing) on the surface of one or more layers of blanket 210.

As described in FIG. 1 above, the rollers and dancers are configured to move blanket 210 along the movement axis represented by arrow 290. In the example of FIG. 2A, each of rollers 266 and 268 may replace any of the rollers and dancers described in FIG. 1 above, are configured to move blanket 210 along the movement axis.

In some embodiments, a rotary encoder 272 is incorporated into roller 266 and is configured to produce rotary-based position signals indicative of an angular displacement of roller 266. Encoder 272 is further configured to provide processor 20 with these rotary-based position signals so as to improve the motion control of blanket 210.

In some embodiments, position sensing assembly 260 comprises any suitable type of a light source, in the present example a light emitting diode (LED) 262, which is configured to emit light beams 264, having any suitable wavelength or range of wavelengths, through an aperture (not shown) mounted on an upper surface 265 of LED 262.

In the example of FIG. 2A, LED 262 is mounted relative to blanket 210, such that surface 265 is substantially parallel to a lower surface 267 of blanket 210, and substantially orthogonal to an axis 263 of LED 262.

In some embodiments, position sensing assembly 260 further comprises a sensor 271, which is configured to sense light beams 264 emitted from LED 262, and to produce position signals indicative of the position of each marker 33 in any suitable coordinate system and/or relative to any reference point in system 11. In an embodiment, light beams 264 may have any wavelength or range of wavelengths within the range of visible light (i.e., 400 nm-700 nm). In another embodiment, light beams 264 may have a wavelength or range of wavelengths within the range of infrared (IR) (i.e., 700 nm-1 mm) or ultraviolet (UV) (i.e., 10 nm-400 nm). In the configuration of assembly 260, light beams 264 is also referred to herein as "backlight" or "diffused light."

In some embodiments, position sensing assembly 260 further comprises a slit 274, which is mounted between blanket 210 and sensor 271. In an embodiment, slit 274 has an opening 275, or a plurality of such opening, configured to pass at least a portion of light beams 264 to sensor 271.

During the operation of system 11, blanket 210 moves in the direction of arrow 290 and light beams 264 impinges on surface 267 of blanket 210. When sections of blanket 210 that comprise the full stack of layers pass above LED 262, light beams 264 are blocked by layer 277 and therefore, cannot be sensed by sensor 271. In contrast, when a section comprising marker 33 passes above LED 262, at least some beams of light beams 264 may pass through transparent layer 273 and sensed by sensor 271.

Note that position sensing assembly 260 produces the position signals by sensing the beams of light beams 264 that are transmitted by LED 262, and pass through transparent layers (e.g., layer 273) of blanket 210, engraved marker 33 and opening 275 of slit 274 to reach sensor 271. In other embodiments, the light may be reflected by, rather than passing through marker 33, as will be described in FIGS. 3A and 3B below.

FIG. 2B is a schematic side view of a position sensing assembly 270, in accordance with an embodiment of the present invention. In some embodiments, assembly 270 may replace, for example, any sensing assembly among sensing assemblies 55A-55H of FIG. 1 above. In some embodiments, assembly 270 and assembly 260 have similar configurations, which differ mainly in regard to the LED configuration. In some embodiments, LED 262 is mounted in position sensing assembly 270, such that an axis 269 of LED 262 is tilted at a predefined angle 276 relative to axis 263. This configuration may improve, for example, the operation, as well as the ease of production and serviceability of assembly 270.

During the operation of system 11, in a time period in which blanket 210 moves in the direction of arrow 290, LED 262 is configured to emit light beams 264 that impinges on surface 267 of blanket 210. When sections of blanket 210 that comprise at least one opaque layer (e.g., layer 277) pass above LED 262, light beams 264 is blocked by layer 277 and therefore, cannot reach sensor 271. When a section comprising marker 33 passes above LED 262, at least some beams of light beams 264 may pass through transparent layer 273 and sensed by sensor 271.

FIG. 2C is a schematic side view of a position sensing assembly 280, in accordance with an embodiment of the present invention. Position sensing assembly 280 may replace, for example, any sensing assembly among assemblies 55A-55H of FIG. 1 above.

In some embodiments, position sensing assembly 280 comprises a laser 282, which is configured to emit a laser beam 286 impinging on surface 267 of blanket 210. Laser beam 286 may have a wavelength selected from one of the ranges described above, e.g., visible, IR or UV, or any other suitable wavelength.

In an example embodiment of FIG. 2C, rollers 268 may not comprise a rotary encoder, so that markers 33 may be used instead of the rotary encoder or any other type of encoder incorporated in system 11. In an embodiment, markers 33, which constitute the encoder integrated in blanket 210, may be used in addition to, or instead of any encoder of system 11. Note that in this embodiment, none of the rollers of system 11 may incorporate an encoder. As described in FIG. 1 above, markers 33 may be used for controlling the operation of various stations and modules of system 11 and for controlling other configurations of systems described above, e.g., duplex printing systems and web printing systems. In another embodiment, any suitable rotary encoder, such as encoder 272 shown in FIG. 2B, may be integrated into at least one of rollers 268.

In some embodiments, position sensing assembly 280 comprises a sensor 284, which is configured to sense beam 286 emitted from laser 282 and, in response to sensing beam 286, to produce position signals indicative of the position of each marker 33 relative to any reference point in system 11. In alternative embodiments, the positions of sensor 284 and laser 282 (e.g., an IR laser) may be swapped, such that laser 282 is positioned above blanket 210 and directing beam 286 towards sensor 284 located below layer 273 of blanket 210.

During the operation of system 11, blanket 210 moves in the direction of arrow 290 and laser beam 286 impinges on surface 267 of blanket 210. When sections of blanket 210 that comprise the full stack of layers pass above LED 262, laser beam 286 is blocked by layer 277 and therefore, cannot be sensed by sensor 284. In contrast, when a section comprising marker 33 passes above laser 282, at least some intensity of laser beam 286 may pass through transparent layer 273 and sensed by sensor 284.

Note that position sensing assembly 280 produces the position signals by sensing photons of laser beam 286, which are passing through transparent layers (e.g., layer 273) of engraved marker 33 to reach sensor 284.

In some embodiments, a suitable slit (not shown), such as slit 274 shown in FIGS. 2A and 2B above, may be mounted between blanket 210 and sensor 284 so as to control the attributes (e.g., angle) of photons reaching sensor 284. In some embodiments, using a laser light source may improve the lateral resolution of sensing assembly 280, which may allow using narrower markers 33. Using a laser (e.g., instead of an LED) light source may also prevent light saturation or flooding of sensor 284, so as to improve the sensitivity of the sensor.

In some embodiments, blanket 210 is made from a stretchable material, and is therefore able to expand and shrink during the operation of system 11. The amount of stretching depends on the materials of the blanket layers, and on various parameters of the printing process, such as printing and drying temperature, motion profile (e.g., speed, acceleration, and deceleration) of blanket 210 and the like.

In some embodiments, markers 33 are integrated into blanket 210, and therefore, are configured to reflect the blanket flexibility and extent of its stretching, and/or to indicate an amount of stretching of blanket 210. For example, when blanket 210 expands e.g., by one percent, the distance between adjacent sections of layer 277 comprising markers 33, may increase by one percent or by another amount indicative of the stretching amount of blanket 210.

In some embodiments, markers 33 have the same flexibility of blanket 210, and therefore are configured to emulate the behavior of blanket 210, as described in the example of one percent stretching described above.

In some embodiments, processor 20 is configured to receive from the aforementioned sensing assemblies, signals indicative of the stretching amount of markers 33 and, based on the signals, to estimate the amount of stretching of blanket 210. Processor 20 is further configured to adjust various parameters of the printing process based on the estimated stretching amount of blanket 210. For example, processor 20 may adjust the motion profile of blanket 210 and the timing of ink jetting from print bars 222 applied to the surface of blanket 210.

FIG. 3A is a schematic side view of a position sensing assembly 300, in accordance with an embodiment of the present invention. In some embodiments, assembly 300 may replace, for example, any sensing assembly among sensing assemblies 55A-55H of FIG. 1 above. In some embodiments, position sensing assembly 300 is configured to sense one or more markers, such as a marker 333 integrated into a blanket 310, and in response to sensing the markers, to produce position signals indicative of the position of respective markers 333.

In some embodiments, blanket 310 comprises multiple layers, such as transparent layer 273 and opaque layer 277 depicted in FIG. 2A above. Note that opaque layer 277 is also a non-reflective layer. Blanket 310 may comprise a reflective layer 379, which may be applied to non-reflective layer 277 or to any other layer (not shown) disposed therebetween.

In the example of FIG. 3A, marker 333 is formed by engraving a pattern in layer 379. The pattern may be formed by removing material from layer 379 using any suitable technique, such as laser ablating, or various etching processes. Additionally or alternatively, marker 333 may comprise a light-reflecting label disposed after engraving at least part of layer 333.

In some embodiments, position sensing assembly 300 comprises a sensing module 340 comprising a laser 306, which may have properties similar to laser 282 of FIG. 2C above. Laser 306 is configured to emit an incident beam 386 directed, at a substantially right angle, or at any other suitable angle relative to an upper surface 302 of layer 379 and on marker 333. In some embodiments, sensing module 340 further comprises a sensor 308, which may have properties similar to sensor 284 of FIG. 2C above, and which is configured to sense a diffused beam 387 reflected from marker 333.

In some embodiments, the engraved pattern of marker 333 may comprise one or more surfaces inclined at a predefined angle relative to surface 302, in the present example multiple triangles 334, which are configured to reflect beam 387 at an angle 312, such that beam 387 is sensed by sensor 308. Note that the position of sensor 308 in sensing module 340 corresponds to angle 312.

In other embodiments, layer 379 may be partially or completely removed at marker 333, and the reflective label described above may comprise the inclined surfaces and may be coupled (e.g., glued) to the laser-facing surface of marker 333.

As described in FIG. 2C above, roller 268 is configured to move blanket 310 in the moving direction shown by arrow 290, and may further comprise rotary encoder 272 so as to provide processor 20 with rotary-based position signals, as described in FIG. 2A above.

FIG. 3B is a schematic side view of a position sensing assembly 360, in accordance with an embodiment of the present invention. In some embodiments, assembly 360 may replace, for example, any sensing assembly among sensing assemblies 55A-55H of FIG. 1 above. In some embodiments, position sensing assembly 360 is configured to sense one or more markers, such as a marker 335 integrated into a blanket 320, and in response to sensing markers 335, to produce position signals indicative of the position of respective markers 335.

In some embodiments, blanket 320 comprises multiple layers, such as layers 277 and 379 depicted, respectively, in FIGS. 2A and 3A above. Blanket 320 further comprises a layer 373 having an upper surface 369 and a lower surface 371.

In the example of FIG. 3B, marker 335 is formed by engraving layers 379 and 277, thereby exposing surface 369 to sensing assembly 360.

In some embodiments, position sensing assembly 360 comprises a sensing module 350 comprising laser 306, which is configured to direct incident beam 386, at a substantially right angle, to surfaces 302 and 369. In some embodiments, sensing module 340 further comprises a sensor 309, which has properties similar to sensor 308 of FIG. 3A above, and which is configured to sense a diffused beam 388 reflected from marker 335.

In some embodiments, layer 373 is transparent to beam 386, however an outer surface 368 of roller 268 is configured to reflect beam 386 and to produce beam 388 directed to sensor 309.

FIG. 3C is a schematic side view of a position sensing assembly 390, in accordance with an embodiment of the present invention. In some embodiments, assembly 390 may replace, for example, any sensing assembly among sensing assemblies 55A-55H of FIG. 1 above. In some embodiments, position sensing assembly 390 is configured to sense one or more markers, such as a marker 392 integrated with a blanket 330, and in response to sensing markers 392, to produce position signals indicative of the position of respective markers 392.

In some embodiments, blanket 330 may have a structure of layers substantially similar to the structure of blanket 320 of assembly 360 shown in FIG. 3B above, or any other suitable structure of layers.

In the example of FIG. 3C, marker 394 is formed by engraving a trench 396 or a hole in at least part of layers 379 and 277 using the engraving methods described above, and filling at least part of trench 396 by applying magnetic layer 394 to layer 373. In some embodiments, magnetic layer 394 is applied into trench 396, such that an upper surface 398 of magnetic layer 394 is flush relative to surface 302 of blanket 330. In other embodiments, the distance between surfaces 398 and 371 may be larger than the distance between surfaces 302 and 371, such that surface 398 extends above surface 302.

In some embodiments, position sensing assembly 390 comprises a magnetic sensor 319, which is configured to sense a magnetic field (not shown) produced when marker 392 passes adjacent to magnetic sensor 319. As described above, position sensing assembly 390 is configured to produce, based on the magnetic field sensed by sensor 319, position signals indicative of the position of marker 392.

Controlling the Shape and Position of Markers Integrated into the Blanket

Figure 4B:
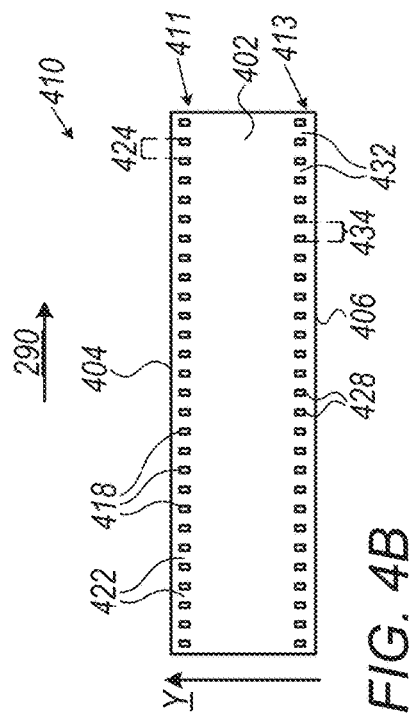
FIGS. 4A, 4B, 4C and 4D are schematic top views of blankets of a digital printing system, in accordance with several embodiments of the present invention.
Figure 4D:
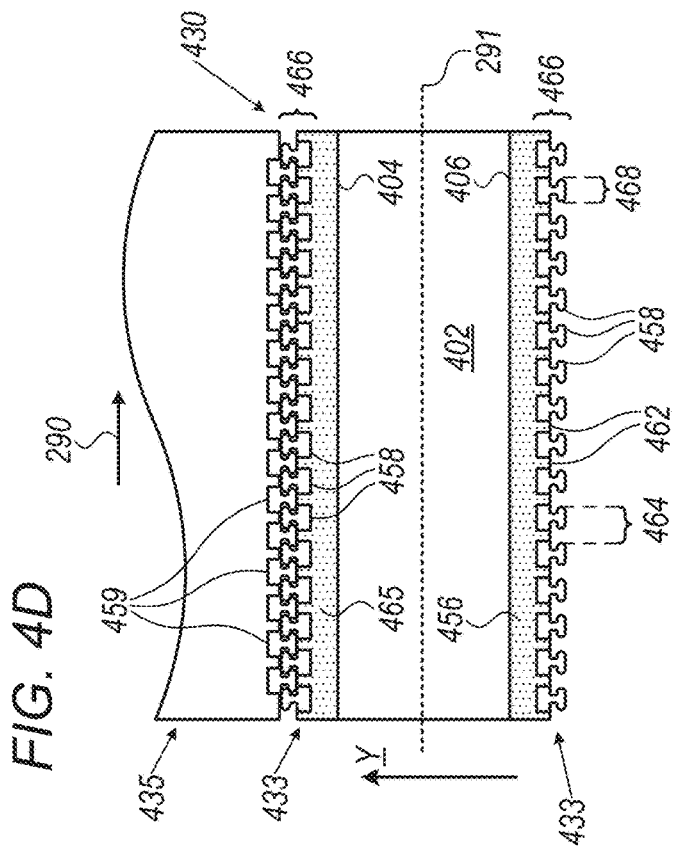
Figure 4A:
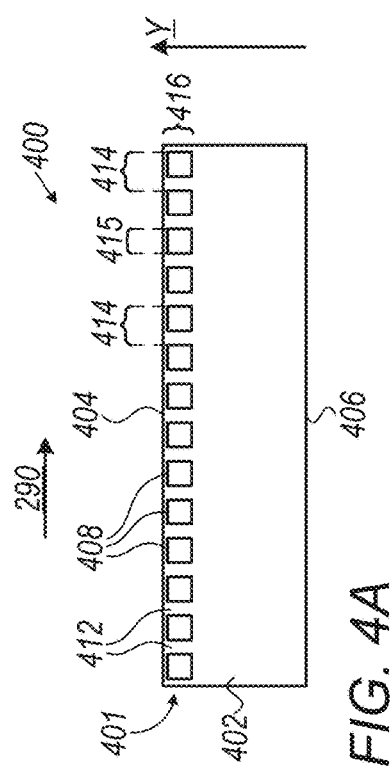

FIG. 4A is a schematic top view of a blanket 400, in accordance with an embodiment of the present invention. Blanket 400 may replace, for example, blanket 210 of system 11. In some embodiments, blanket 400 comprises a flexible substrate 402 comprising a stack of multiple layers (not shown) described in detail in FIGS. 6 and 7 below. In some embodiments, substrate 402 has two edges, referred to herein as ends 404 and 406 located along a Y axis, which is the width of blanket 400. Ends 404 and 406 are substantially parallel to arrow 290 and are orthogonal to the Y axis.

In some embodiments, blanket 400 comprises a linear encoder 401, which is an integral part of blanket 400 and comprises a plurality of markers 408 formed during the production process of blanket 400, and separated by respective buffers 412.

In the example of FIG. 4A, encoder 401 is formed adjacent to end 404, the position of encoder 401 is referred to herein as a bevel of substrate 402 and of blanket 400, and markers 408 are interleaved with buffers 412, such that each buffer 412 separates between two respective neighbor markers 408 and vice versa. Each marker 408 has a predefined length 415 and width 416, such that the total size of length 415 and a respective neighbor buffer 412 defines a pitch 414 of each marker 408. In the example embodiment of FIG. 4A, each marker 408 has a substantially similar shape, size (e.g., length and width in case of a rectangular-shaped) and pitch. In another embodiment, at least one of the shape, size, pitch and location of the marker may vary along substrate 402. For example, the blanket may comprise two types of markers interleaved with one another, or any other suitable variation of the configuration described above. Note that the size of width 416 is typically small relative to the distance between ends 404 and 406 (e.g., about 15 mm), so that markers 408 will not overlap with the ink image formed on the surface of substrate 402.

As described in FIG. 2A above, markers 408 may be formed by engraving the multilayered structure of blanket 400, but may additionally or alternatively be formed using other suitable processing techniques, such as by ink-jetting, by three-dimensional (3D) printing, by applying magnetic materials between the layers and/or on top of an outer layer of the blanket.

FIG. 4B is a schematic top view of a blanket 410, in accordance with an embodiment of the present invention. Blanket 410 may replace, for example, blanket 210 of system 11. In some embodiments, blanket 410 comprises two linear encoders 411 and 413, formed, respectively, adjacent to ends 404 and 406 of blanket 410, also referred to herein as the bevels of substrate 402. Encoder 411 comprises a plurality of markers 418 interleaved with and separated by respective buffers 422, such that every pair of a marker 418 coupled to a respective buffer 422 forms a marker pitch 424. Similarly, encoder 413 comprises markers 428 interleaved with and separated by respective buffers 432, such that a pair of a marker 428 coupled to a respective buffer 432 form a marker pitch 434.

In the example of FIG. 4B, encoders 411 and 413 are substantially identical to one another, and are formed at substantially identical distances from ends 404 and 406, respectively. Similar to encoder 401 of blanket 400, encoders 411 and 413 are integral parts of blanket 410, and are typically formed during the production process of blanket 410.

Figure 4C:
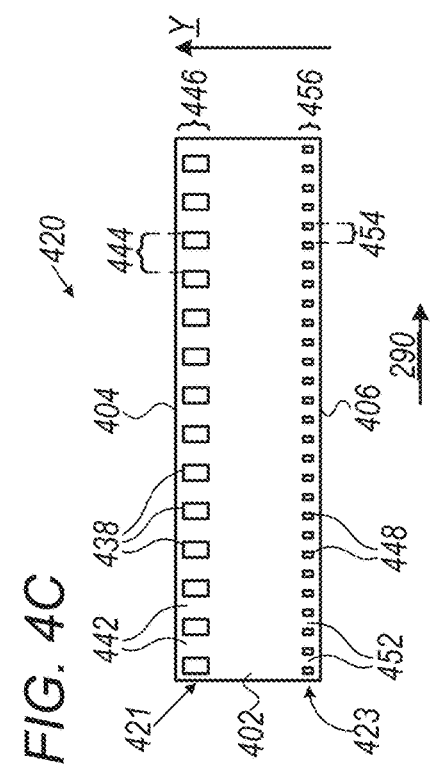

FIG. 4C is a schematic top view of a blanket 420, in accordance with an embodiment of the present invention. Blanket 420 may replace, for example, blanket 210 of system 11. In some embodiments, blanket 420 comprises two different linear encoders 421 and 423, formed, respectively, adjacent to ends 404 and 406 of blanket 420. Encoder 421 comprises a plurality of substantially identical markers 438 having a width 446 and are interleaved with and separated by respective buffers 442, such that a marker pitch 444 comprises a pair of markers 438 and buffer 442 coupled to one another. Similarly, encoder 423 comprises markers 448 having a width 456 and are interleaved with and separated by respective buffers 452, such that a marker pitch 454 comprises a pair of markers 448 and buffer 452 coupled to one another.

In the example of FIG. 4C, encoders 421 and 423 differ from one another, for example width 446 is larger than width 456, and pitch 444 is larger than pitch 454. Furthermore, encoders 421 and 423 may be formed at substantially identical distances from ends 404 and 406, respectively, or at different distances. Encoders 421 and 423 are integral parts of blanket 420, and are typically formed during the production process of blanket 420 using one or more of the production techniques described above.

The configurations of blankets 400, 410 and 420 are provided purely by way of example for the sake of clarity of the present invention. In other embodiments, an encoder, such as encoder 401 may comprise any suitable type of markers, such as a grid marker, a motion encoding code, a one-dimensional (1D) barcode, a two-dimensional (2D) barcode, and a three-dimensional (3D) barcode. Furthermore, each of the 2D barcodes may comprise a quick response (QR) code, an AZTEC code, and/or any other type of a 2D barcode.

Additionally or alternatively, the 3D barcodes may be produced by engraving a 3D structure (e.g., a trench, a hole, or a staircase) in one or more of the blanket layers, and/or by producing a 3D structure that forms a topographic outer surface of the blanket (e.g., forming a 3D structure between the layers, thereby forming topography on the outer surface of the blanket) and/or by producing a 3D structure within the engraved 3D structure (e.g., triangles 334 of FIG. 3A above).

As described above, the 3D structures may be formed between the blanket layers, as part of at least one of the outer layers, or disposed on the upper surface of the outer layer of the blanket.

Moreover, the 3D structures may be formed using 3D printing or any other suitable techniques during the production of the blanket. Note that the uppermost surface of the 3D structure may be within the engraved structure (e.g., between the blanket layers), or flush with the surface of the outer layer of the blanket, or extends out of the surface of the outer layer of the blanket.

Similarly, the 1D and 2D barcodes may be formed using at least one of the above techniques applied for producing the 3D structures. For example, by engraving 1D or 2D structure in the blanket and filling the engraved structure with a filling material such that an outer surface of the filling material is flush with the outer surface of the outer layer of the blanket.

In other embodiments, the markers may be formed by engraving structures at predefined locations in the outer surface of the outer layer of the blanket, and jetting ink droplets adapted to adhere only to the surface of the engraved structures. Additionally or alternatively, the markers may be produced by jetting ink droplets between the blanket layers and/or on top of the outer layer of the blanket.

As described in FIG. 2C above, the blanket (e.g., blanket 420) is configured to stretch during the operation of system 11.

In some embodiments, the encoders (e.g., encoders 421 and 423) are integrated into blanket 420, and therefore, are configured to indicate an amount of stretching of blanket 420. In the example of FIG. 4C, when blanket 420 expands, e.g., by one percent, at least one of markers 438 and 448 and at least one of respective buffers 422 and 452, may expand by one percent or by another amount indicative of the stretching amount of blanket 420.

In some embodiments, processor 20 is configured to receive from the sensing assemblies, signals indicative of the stretching amount of markers 438 and 448 and buffers 422 and 452 and, based on the signals, to estimate the amount of stretching of blanket 420. Based on the estimated amount of stretching, processor 20 may adjust various parameters of the printing process so as to compensate for the stretching of blanket 420.

FIG. 4D is a schematic top view of a blanket 430, in accordance with another embodiment of the present invention. Blanket 430 may replace, for example, blanket 210 of system 11. In some embodiments, blanket 430 comprises guiding elements arranged along a longitudinal axis 291 of blanket 430. In the example of FIG. 4D, the guiding elements comprise two parts (typically halves) of zippers, referred to herein as zip fasteners 433, which are coupled to the longitudinal edges of blanket 430, such as ends 404 and 406 described above. In other embodiments, only one of zip fasteners 433 is engaged with a respective longitudinal edge of blanket 430. In alternative embodiments, blanket 430 may comprise any other suitable type of guiding elements.

In some embodiments, zip fasteners 433 are configured to engage, along longitudinal axis 291, with a guiding subsystem of system 10, so as to move blanket 430 along the movement axis represented by arrow 290. In some embodiments, the guiding subsystem may comprise, inter-alia, the aforementioned rollers (e.g., rollers 232, 240, 242 and 253) described in FIG. 1 above, and guiding tracks 435, which are configured to engage with blanket 430 as will be described in detail below.

In an example embodiment shown in FIG. 4D, one zip fastener 433 is engaged with a respective guiding track 435 of the guiding subsystem. This configuration is shown for conceptual clarity and for a detailed description of zip fastener 433 depicted below. In another embodiment, the guiding subsystem of system 10 may comprise two guiding tracks 435 positioned at both sides of blanket 430. In an embodiment, both zip fasteners 433 of blanket 430 are engaged with both respective guiding tracks 435, along a continuous path parallel to longitudinal axis 291.

In some embodiments, the engagement between zip fasteners 433 and guiding tracks 435 enables the guiding subsystem to apply lateral tension to blanket 430, so as to maintain substrate 402 taut along Y axis. The engagement also enables the guiding subsystem to apply longitudinal force to substrate 402, so as to rotate blanket 430 along the continuous path, in the direction of the movement axis represented by arrow 290.

In some embodiments, zip fasteners 433 comprise strips 465, which can be made from substantially identical or different materials, and sewn or otherwise coupled, to at least one of ends 404 and 406.

In some embodiments, the guiding subsystem may comprise different types of guiding elements, for example, strips 465 may have mutually different grades of elasticity. Examples of zip fasteners suitable for use with various types of ITMs, in system 10 and in other configurations of printing systems, are described in detail, for example, in PCT Patent Application Publication WO 2013/136220 and in PCT Patent Application PCT/IB2018/058009, whose disclosures are all incorporated herein by reference.

In some embodiments, zip fastener 433 comprises a plurality of similar or different lateral formations formed along the longitudinal edge of strips 465, in the present example, the lateral formations comprise teeth 458 having a width 466 of about 1 cm or any other suitable size and a length 468 of about 5.5 mm or any other suitable size. Teeth 458 are interleaved with and separated by respective predefined spacing, referred to herein as buffers 462. In this configuration, zip fastener 433 comprises a marker pitch 464 of about 7.5 mm or any other suitable size, which comprises a pair of one tooth 458 and one buffer 462.

In an embodiment, zip fastener 433 may comprise any suitable number of teeth 458, such as but not limited to between 3000 and 8200 teeth. In this embodiment, length 468 of a single tooth 458 may be between 0.003% and 0.005% of the total length of blanket 430. In another embodiment, each zip fastener 433 may comprise more than 500 teeth 458, for example, about 1375 teeth 458, so that in case of two zip fasteners 433 coupled, respectively, to ends 404 and 406, blanket 430 may comprise a total number of about 2750 teeth 458. In this embodiment, length 468 of a single tooth 458 may be about 0.05% of the total length of blanket 430. In these embodiments, length 468 of a single tooth 458, also referred to herein as a longitudinal marker dimension, may be between 0.003% and 0.05% of the total length of blanket 430, also referred to herein as a longitudinal ITM dimension.

In some embodiments, guiding track 435 of the guiding subsystem comprises teeth 459 (or any other suitable type of lateral formations) positioned, along longitudinal axis 291, at a predefined spacing from one another. In some embodiments, teeth 459 and 458 have size, shape and arrangement that enables the aforementioned engagement between zip fastener 433 and the respective guiding track 435.

In some embodiments, at least one of zip fasteners 433 may act as a linear encoder having markers, such as teeth 458, buffers 462, marker pitch 464, or any suitable combination thereof.

In some embodiments, system 11 comprises sensing assemblies, such as sensing assemblies 55A-55H of FIG. 1 above. The sensing assemblies are configured to produce, in response to sensing at least one of the markers of zip fasteners 433, electrical signals, such as position signals indicative of respective positions of the respective markers.

As described above, based on the position signals received from sensing assemblies 55A-55H, processor 20 is configured to control the torque applied to blanket 430 by each roller, so as to maintain the upper run of blanket 430 taut and isolated from being affected by the mechanical vibrations at the lower run.

In some embodiments, in response to a stretching of substrate 402, the aforementioned markers of zip fastener 433 are configured to indicate an amount of stretching of blanket 430. For example, the size of one or more buffers 462, and marker pitches 464 may increase.

In some embodiments, teeth 458 may be shaped to improve the accuracy of the position signals received from sensing assemblies 55A-55H. For example, teeth 458 may have at least one sharp edge that may be sensed by sensing assemblies 55A-55H with high repeatability. For example, one or more of teeth 458 may have any suitable geometrical shape, such as but not limited to, a round shape, a rectangular shape, a square shape, a trapezoid shape, or a star shape.

In some embodiments, one or more markers of zip fastener 433, e.g., teeth 458 or buffer 462, may have a protrusion and/or an intrusion that may improve the sensing repeatability of sensing assemblies 55A-55H.

In other embodiments, one or more teeth 458 or any other markers of zip fastener 433, may comprise magnetic material, which may be sensed by one or more suitable magnetic sensing assemblies mounted on system 11.

Additionally or alternatively, at least some markers of zip fastener 433 (e.g., teeth 458 or buffer 462) may have two or more colors having a distinctive divider that may further improve the sensing repeatability of sensing assemblies 55A-55H.

In alternative embodiments, each zip fastener 433 may have a different configuration of markers, such that blanket 430 may comprise two different encoders in close proximity to ends 404 and 406, as described for example in blanket 420 of FIG. 4C above.

In some embodiments, processor 20 may use the two different encoders for producing two respective sets of position signals. The different position signals may be used for controlling two different aspects in the process of applying the ink image to the surface of substrate 402.

In some embodiments, the sets of markers may differ from one another, for example, in width or buffer size, or pitch or a combination thereof.

In some embodiments, at least one of the markers of zip fastener 433 may comprise at least one code, such as the grid marker or motion encoding code described in FIG. 3C above.

In other embodiments, at least one of the markers of zip fastener 433 may comprise a one-dimensional (1D) barcode, a two-dimensional (2D) barcode, or a three-dimensional (3D) barcode. For example, at least some teeth 458, or buffers 462, or a combination thereof, may have one of the aforementioned barcodes patterned or engraved, or printed thereon.

The configuration of zip fastener 433 is shown by way of example, in order to illustrate motion control problems that are addressed by embodiments of the present invention and to demonstrate the application of these embodiments in enhancing the printing performance of system 11. Embodiments of the present invention, however, are by no means limited to this specific sort of example encoder, and the principles described herein may similarly be applied to other sorts of substrates and transfer members used in any other sorts of printing systems.

Figure 5C:
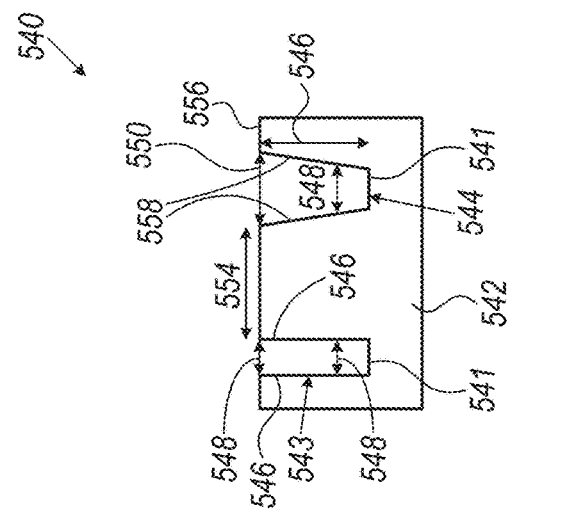
FIGS. 5A, 5B, and 5C are schematic sectional views of blankets of a digital printing system, in accordance with several embodiments of the present invention.
Figure 5B:
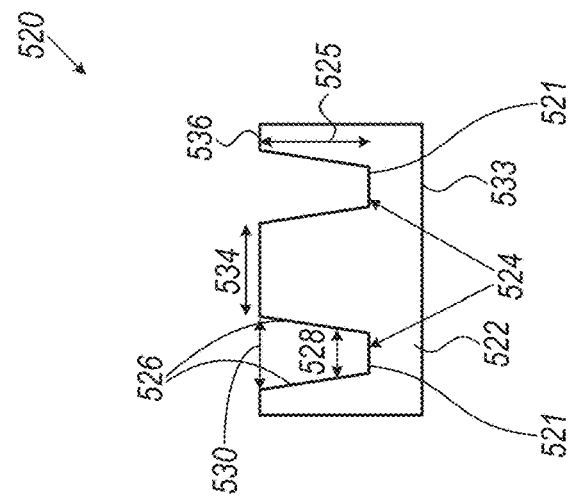
Figure 5A:
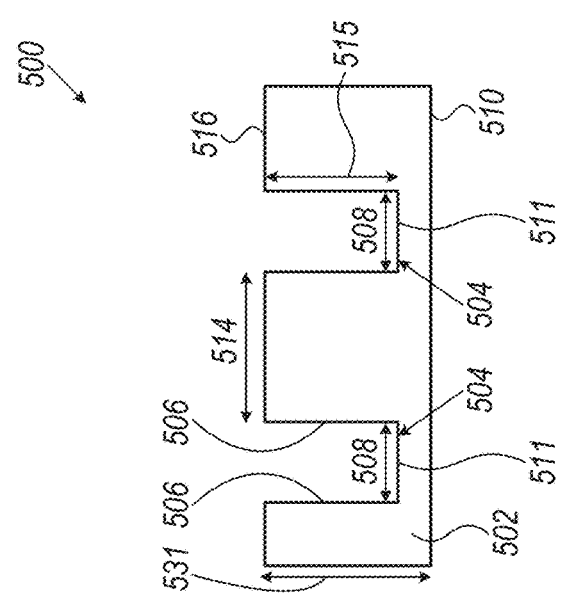

FIG. 5A is a schematic sectional view of a blanket 500, in accordance with an embodiment of the present invention. Blanket 500 may replace, for example, blanket 210 of system 11. In some embodiments, blanket 500 comprises multiple 3D structures 504 (e.g., trenches or holes described, for example, in FIG. 4C above) engraved in one or more layers of a substrate 502 having a thickness 531.

In an example embodiment of FIG. 5A, all structures 504 have substantially identical width 508 and depth 515, and are separated by respective buffers 514. Moreover, structures 504 have a symmetrical sectional shape with sidewalls 506 substantially orthogonal relative to a top surface 516 and to a bottom surface 511. Note that a dept-to-thickness ratio, e.g., between depth 515 and thickness 531, may have any value between 0.01 and 0.99.

As depicted in FIG. 4C above, after engraving, structure 504 may be at least partially filled with any suitable filling material, also referred to herein as a filler layer (not shown in FIG. 5A).

In another embodiment, the depth-to-thickness ratio may differ between structures. For example, at least two 3D structures may have different levels of depth 515. Furthermore, in the example of FIG. 5A, surface 511 is substantially parallel to top and bottom surfaces 516 and 510, respectively. In alternative embodiments, surface 511 may not be parallel to any of surfaces 516 and 510, e.g., inclined at one side, resulting in different lengths between sidewalls 506.

FIG. 5B is a schematic sectional view of a blanket 520, in accordance with an embodiment of the present invention. Blanket 520 may replace, for example, blanket 210 of system 11. In some embodiments, blanket 520 comprises multiple 3D structures 524 (e.g., trenches or holes described, for example, in FIG. 4C above) engraved in one or more layers of a substrate 522 having a buffer 534 separating therebetween and a uniform depth 525.

In an example embodiment of FIG. 5B, at least two structures 524 have slanted sidewalls 526 having non-right angles between sidewalls 526 and at least one of top and bottom surfaces 536 and 521, respectively. As a result, a width 528 between sidewalls 526 measured on surface 521 is smaller than a width 530 measured between sidewalls 526 at the level of top surface 536.

In alternative embodiments, blanket 520 may comprise a non-uniform depth 525 among different structures 524, and/or at least one inclined surface among surfaces 536, 521 and 533, and/or any other variation in the structure of blanket 520. The variations may be intended by design, or undesired due to variations in the production process of blanket 520.

Note that the two sets of width (e.g., widths 528 and 530) may be used by sensing assemblies (e.g., assemblies 55A-55H of FIG. 1 above) for producing two respective sets of position signals, which may be used for controlling two different aspects in the ink image placement process carried out by system 11. For example, the two sets of position signals may be indicative of stress and/or strain between surfaces 533 and 536 of blanket 520.

FIG. 5C is a schematic sectional view of a blanket 540, in accordance with an embodiment of the present invention. Blanket 540 may replace, for example, blanket 210 of system 11. In some embodiments, blanket 540 comprises a plurality of at least two different 3D structures 543 and 544 (e.g., trenches or holes described, for example, in FIG. 4C above) interleaved with one another and engraved in one or more layers of a substrate 542 having a buffer 554 separating therebetween. Note that blanket 540 has two sets of structures 543 and 544, interleaved with one another such that every structure 543 has two neighbor structures 544 and vice versa.

In an example embodiment of FIG. 5C, structures 543 and 544 have a uniform depth 545, but their sidewalls are different. Sidewalls 546 of structure 543 are substantially orthogonal to at least one of surfaces 521 and 536 (similar to sidewalls 506 of blanket 500 depicted in FIG. 5A above), whereas sidewalls 558 of structure 544 are slanted and are not orthogonal to at least one of surfaces 521 and 536 (similar to sidewalls 526 of blanket 520 depicted in FIG. 5B above).

In some embodiments, the configuration of blanket 540 may enable incorporation of two or more encoders interleaved with one another or arranged at any other suitable configuration. For example, structure 543 has substantially identical width 548 between sidewalls 546 at both surfaces 556 and 541, whereas structure 544 may have a similar width 548 at surface 541 but a typically larger width 550 at the level of surface 556.

In some embodiments, processor 20 of system 11 is configured to receive from sensing assemblies (e.g., assembly 360 of FIG. 3B above), one or more sets of position signals produced from structures 543 and 544. For example, first and second sets comprising different reflections sensed from surface 556 of structures 543 and 544 respectively, and a third set comprising a double density of reflections sensed from surface 541 of both structures 543 and 544. The example configuration of blanket 540 provides a user with multiple codes received from one or more sensing assemblies mounted adjacent to blanket 540. Each code may address a different aspect related to the control of the ink image placement on surface 556 (or another top surface shown, for example, in FIG. 7 below) of blanket 540.

Methods for Producing Encoders Integrated in Blankets

FIG. 6 is a diagram that schematically illustrates a sectional view of a process sequence for producing a blanket 600 comprising integrated markers 612, in accordance with an embodiment of the present invention. Blanket 600 may replace, for example, blanket 210 of system 11.

The process begins at a step 1 with preparing on a carrier 616, an exemplary stack of five layers comprising blanket 600.

In some embodiments, carrier 616 may be formed of a flexible foil, such as a flexible foil mainly consisting of, or comprising, aluminum, nickel, and/or chromium. In an embodiment, the foil comprises a sheet of aluminized polyethylene terephthalate (PET), also referred to herein as a polyester, e.g., PET coated with fumed aluminum metal.

In some embodiments, carrier 616 may be formed of an antistatic polymeric film, for example, a polyester film. The properties of the antistatic film may be obtained using various techniques, such as addition of various additives, e.g., an ammonium salt, to the polymeric composition.

In some embodiments, carrier 616 has a polished flat surface (not shown) having a roughness (Ra) on an order of 50 nm or less, also referred to herein as a carrier contact surface. In some embodiments, a fluid first curable composition (not shown) is provided and a release layer 602 is formed therefrom on the carrier contact surface. In some embodiments, release layer 602 comprises an ink reception surface 603 configured to receive the ink image, e.g., from image forming station 212 of system 11, and to transfer the ink image to a target substrate, such as sheet 226, shown and described in FIG. 1 above. Note that layer 602, and particularly surface 603 are configured to have low release force to the ink image, measured by a wetting angle, also referred to herein as a receding contact angle (RCA), between surface 603 and the ink image, as will be described below.

The low release force enables complete transfer of the ink image from surface 603 to sheet 226. In some embodiments, release layer 602 is made from a typically transparent silicon elastomer, such as a vinyl-terminated polydimethylsiloxane (PDMS), or from any other suitable type of a silicone polymer, and may have a typical thickness of 50 μm, or any other suitable thickness larger than 10 μm.

In some embodiments, the fluid first curable material comprises a vinyl-functional silicone polymer, e.g., a vinyl-silicone polymer comprising at least one lateral vinyl group in addition to the terminal vinyl groups, for example, a vinyl-functional polydimethyl siloxane.

In some embodiments, the fluid first curable material may comprise a vinyl-terminated polydimethylsiloxane, a vinyl-functional polydimethylsiloxane comprising at least one lateral vinyl group on the polysiloxane chain in addition to the terminal vinyl groups, a crosslinker, and an addition-cure catalyst, and optionally further comprises a cure retardant.

In the example of FIG. 6, release layer 602 may be uniformly applied to PET-based carrier 616, leveled to a thickness of 5-200 μm, and cured for approximately 2-10 minutes at 120-130° C. Note that the hydrophobicity of ink transfer surface 603 may have a RCA of about 60°, with a 0.5-5 microliter (μl) droplet of distilled water. In some embodiments, a surface 605 of release layer 602 may have a RCA that is significantly higher, typically around 90°.

In some embodiments, PET carriers used to produce ink-transfer surface 603 may have a typical RCA of 40° or less. All contact angle measurements were carried out using a Contact Angle analyzer "Easy Drop" FM40Mk2 produced by Krüss™ GmbH, Borsteler Chaussee 85, 22453 Hamburg, Germany and/or using a Dataphysics OCA15 Pro, produced by Particle and Surface Sciences Pty. Ltd., Gosford, NSW, Australia.

In some embodiments, release layer 602 may have a low release force to several types of materials, and therefore layer 602 may not be applied to locations designated for markers, such as at the bevels of substrate 402 described in FIGS. 4A, 4B and 4C above. Further details on these embodiments are described below.

In some embodiments, blanket 600 comprises a compliance layer 604, also referred to herein as a conformal layer, typically made from PDMS with a black pigment additive. Compliance layer 604 is applied to release layer 602 and may have a typical thickness of 150 μm or any other suitable thickness equal to or larger than 100 μm. Note that compliance layer 604 is configured to attenuate substantial intensity of light at selected wavelengths from being transmitted therethrough and/or from being reflected therefrom.

It will be understood that the level of attenuation depends on various parameters, such as layer thickness and wavelength of the light emitted by the sensing assembly. For example, UV wavelengths (10 nm-400 nm) may have larger attenuation compared to visible light (400 nm-700 nm) and IR (700 nm-1 mm).

In some embodiments, compliance layer 604 may have mechanical properties (e.g., greater resistance to tension) that differ from release layer 602. Such desired differences in properties may be obtained, e.g., by utilizing a different composition with respect to release layer 602, by varying the proportions between the ingredients used to prepare the formulation of release layer 602, and/or by the addition of further ingredients to such formulation, and/or by the selection of different curing conditions. For example, adding filler particles may increase the mechanical strength of compliance layer 604 relative to release layer 602.

In some embodiments, compliance layer 604 has elastic properties that allows release layer 602 and surface 603 to follow closely the surface contour of a substrate onto which an ink image is impressed (e.g., sheet 226). The attachment of compliance layer 602 to the side opposite to ink-transfer surface 603 may involve the application of an adhesive or bonding composition in addition to the material of compliance layer 602.

In some embodiments, blanket 600 comprises reinforcement stacked layers, also referred to herein as a support layer 607 or a skeleton of blanket 600, which is applied to compliance layer 604 and is described in detail below. In some embodiments, support layer 607 is configured to provide blanket 600 with an improved mechanical resistance to deformation or tearing that may be caused by the torque applied to blanket 600 by the rollers and dancers. In some embodiments, the skeleton of blanket 600 comprises an adhesion layer 606, made from PDMS or any other suitable material, which is formed together with a woven fiberglass layer 608. In some embodiments, layers 606 and 608 may have typical thickness of about 150 μm and 112 μm, respectively, or any other suitable thickness, such that the thickness of support layer 607 is typically larger than 100 μm.

In other embodiments, the skeleton may be produced using any other suitable process, e.g., by disposing layer 606 and subsequently coupling layer 608 thereto and polymerizing, or by using any other process sequence.

In some embodiments, the polymerization process may be based on hydrosilylation reaction catalyzed by platinum catalyzed, commercially known as "addition cure."

In other embodiment, the skeleton of blanket 600 may comprise any suitable fiber reinforcement, in the form of a web or a fabric, to provide blanket 600 with sufficient structural integrity to withstand stretching when blanket 600 is held in tension in system 11. The skeleton may be formed by coating the fiber reinforcement with any suitable resin that is subsequently cured and remains flexible after curing.

In an alternative embodiment, support layer 607 may be separately formed, such that fibers embedded and/or impregnated within an independently cured resin. In this embodiment, support layer 607 may be attached to compliance layer 604 via an adhesive layer, optionally eliminating the need to cure support layer 607 in situ. In this embodiment, support layer 607, whether formed in situ on compliance layer 604 or separately, may have a thickness of between about 100 micrometers and about 500 μm, part of which is attributed to the thickness of the fibers or the fabric, which thickness generally varies between about 50 μm and 300 μm. Note that thickness of support layer 607 is not limited to the above values.

In some embodiments, blanket 600 comprises a high-friction layer 610, also referred to herein as a grip layer, made from a typically transparent PDMS and configured to make physical contact between blanket 600 and the rollers and dancers of system 11 described in FIG. 1 above. Note that although layer 610 is made from relatively soft materials, the surface facing the rollers has high friction so that blanket 600 will withstand the torque applied by the rollers and dancers without sliding. In an example embodiment, layer 610 may have a thickness of 100 µm, but may alternatively have any other suitable thickness, e.g., between 10 µm and 1 mm.

Additional embodiments that implement step 1 of FIG. 6 are described in detail, for example, in PCT International Publication WO 2017/208144, whose disclosure is incorporated herein by reference.

At a step 2, the process comprises engraving 3D structures (e.g., a trench, a hole, or a staircase), referred to herein as markers 612, in one or more of the layers comprising blanket 600. Note that step 2 shows a sectional view of the bevel of blanket 600, in which markers 612 are formed. As shown in FIGS. 4A, 4B and 4C, the markers are formed at the bevel of the blanket so that the markers do not overlap with the ink image formed on the upper surface of the blanket. Thus, it will be understood that the sectional views of FIGS. 6 and 7 represent regions of the blanket separated from the ink image.

In the example of step 2, markers 612 are formed in layers 602 and 604 and may optionally be engraved at least through layer 602, and optionally also through layer 604, and may be further extended into at least part of layer 606. In some embodiments, markers 612 are engraved to a depth larger than 200 µm using laser techniques, such as laser marking or laser ablation. In other embodiments, at least one of markers 612 may be engraved into at least part of one or more of layers 602, 604 and 606. For example, a first group of one or more markers 612 may be engraved into part of or the entire thickness of layer 602, a second group of one or more markers 612 may be engraved through the entire thickness of layer 602 and into part of or the entire thickness of layer 604, and a third group of one or more markers 612 may be engraved through the entire thickness of layers 602 and 604 and into part of or the entire thickness of layer 606.

In yet other embodiments, one or more of markers 612 may be engraved into at least part of at least one layer of the stack comprising layers 602, 604 and 606 and one or more other markers 612 may be engraved into at least part of one or more other layers of the stack. For example, one or more markers 612 may be engraved into part of or the entire thickness of layer 602, and one or more other markers 612 may be engraved into part of or the entire thickness of layer 604 and/or 606 using any suitable engraving process described herein.

In other embodiments, markers 612 may be engraved using any other suitable process, such as DPM using punching or pinning techniques, as described in FIG. 2A above, or by applying any other suitable processing technique.

In some embodiments, marker 612 may have a square shape, such as markers 408 shown in FIG. 4A, a rectangle shape, such as markers 418 and 438 shown in FIGS. 4B and 4C, respectively. Additionally or alternatively, other suitable shapes such as round, ellipse, star, can also be used. Several example shapes are described in FIGS. 4A, 4B and 4C above.

In some embodiments, marker 612 may have any suitable shape in a sectional view, such as 3D structure 504 of blanket 500 depicted in FIG. 5A above and having right-angle sidewalls 506, or structures 524 of blanket 520 depicted in FIG. 5A above and having slanted sidewalls 526, or a combination thereof shown, for example, in FIG. 5C, or any other suitable shape described, for example, in FIGS. 5A, 5B and 5C above.

At a step 3, the process comprises applying a filling material, also referred to herein as a filler layer 614, into the engraved 3D structures of markers 612. As described above, release layer 602 may have a low releasing force to several types of materials, such as to filler layer 614, which is configured to fill the engraved 3D structures of markers 612.

Note that filler layer 614 is configured to adhere to layer 604 and to other layers of blanket 600 but not to layer 602. In some embodiments, layer 602 may not be applied to locations designated for markers 612, such as at the bevels of blanket 600 as described at step 1 above, and in more details in FIGS. 4A and 4C above. In other embodiments, layer 602 may be applied across blanket 600 at step 1, and removed from the bevels of blanket 600 before applying layer 614 at step 3.

In some embodiments, filler layer 614 is configured to have chemical affinity to a silicone polymer so as to conform to PDMS-based layers 602, 604 and 606. Additionally or alternatively, layer 614 may have any suitable elastic modulus so as to maintain the flexibility of blanket 600.

In some embodiments, filler layer 614 is configured to have mechanical and chemical stability, at a temperature range between 0° C. and 180° C., in other words, the chemical and mechanical properties of filler layer 614 are retained as they are in room temperature, and chemical resistance, e.g., no thermal decomposition, no weight loss or properties loss, are occurred.

In some embodiments, layer 614 is configured to have durability to abrasion and resistance to scratch (e.g., surface hardness larger than 30 Shore A) that are comparable to or larger than of blanket 600. Furthermore, layer 614 is configured to receive various types of additives so as to control optical attributes, such as transparency, reflectivity and color, magnetic attributes, and resistance to mechanical (e.g., tensile) stress.

The removal of layer 602 from the bevels may be carried out, for example, by etching at selected locations of the bevels, or by using other suitable techniques. In other embodiments, layer 602 may be removed from at least one of the bevels of blanket 600 prior to applying filler layer 614 to the respective bevels of blanket 600 comprising markers 612. Step 3 concludes the process sequence of FIG. 6.

The configuration of blanket 600 is provided purely by way of example for the sake of clarifying the present invention. In other embodiments, blanket 600 may comprise a single layer or any other suitable number of layers. In these embodiments, at least one of the layers of blanket 600 may comprise any other suitable material such as but not limited to a polytetrafluoroethylene, a polyester, a polyimide, a polyvinylchloride (PVC), a polyolefin, an elastomer, a polystyrene-based polymer, a polyamide-based polymer, a methacrylate-based elastomer, a rubber, a polyurethane, a polycarbonate, an acrylic and a combination of at least two of these materials.

Additionally or alternatively, blanket 600 may comprise three-dimensional (3D) markers that may be formed by engraving (or using any other suitable technique) holes and/or trenches in two or more layers of blanket 600. For example, blanket 600 may comprise an L-shaped 3D marker or an inversed T-shaped 3D marker. In such embodiments, the large lateral portion of the 3D marker may be formed by engraving, for example, layer 606, and the smaller portion of the 3D marker (e.g., the "pole" of the "L" or the "leg" of the inversed "T") may be formed by engraving layer 604. The sensing assemblies described above may sense such 3D markers through any transparent or partially transparent layers, so that blanket 600 may comprise an increased density of markers having any desired shape. Therefore, processor 20 may receive a larger amount and more valuable information on the blanket in question, which may assist processor 20 in tightening the printing process control and therefore, may improve the quality of the printed image on the target substrate.

FIG. 7 is a diagram that schematically illustrates a sectional view of a process sequence for producing a blanket 700 comprising integrated markers 710, in accordance with an embodiment of the present invention. Blanket 700 may replace, for example, blanket 210 of system 11.

In some embodiments, the layers in FIG. 7 are similar to the layers in FIG. 6 above, but undergo different respective process sequences. Therefore, FIG. 7 emphasizes the different sequence of the process.

The process begins at a step 1 with applying a release layer 704 to a polyester (PET) substrate 702, followed by polymerization of release layer 704. Subsequently, a compliance layer 706 is applied to release layer 704.

In some embodiments, a layer 708 made from any suitable polymer material (e.g. plastic) may be applied to compliance layer 706 so as to protect compliance layer 706 during the engraving process depicted in step 2 below. In other embodiments, step 1 of the process may be concluded after applying compliance layer 706, without applying layer 708.

At a step 2, the process comprises engraving 3D structures, also refers to herein as markers 710, in one or more layers of blanket 700. The engraving may be carried out using any of the engraving techniques described above. In the example embodiment depicted in FIG. 7, the 3D structures are engraved through layer 706.

In some embodiments, further to the engraving process, layer 708 is removed to conclude step 2 of the process. In other embodiments described in step 1 above, layer 708 is not applied to layer 706. In these embodiments, step 2 of the process may comprise an additional sub-step of cleaning the outer surface of layer 706 and the 3D structures of markers 710 from by-product residues of the engraving process.

Note that step 2 shows a sectional view of a bevel of blanket 700, in which markers 710 are formed in regions non-overlapping the ink image applied to release layer 704 of blanket 700 during the digital printing process.

At a step 3, the process comprises applying a stack comprising a filling material, also referred to herein as a filler layer 712, which is applied to a fiberglass layer 714. In some embodiments, filler layer 712 is configured to fill the engraved 3D structures of markers 710 and to be coupled to layer 706. In some embodiments, filling material 712 is configured to adhere to the inner part (e.g., the bulk) of release layer 704, whereas the outer surface of layer 704 typically exhibits low adhesion to a wide selection of materials, such as to filling material 712.

In some embodiments, layers 712 and 714 are applied to both layer 706 and markers 710 in a single operation, and subsequently, layer 712 is polymerized. In alternative embodiments, layers 712 and 714 may be disposed using any other suitable sequence.

At a step 4, the process comprises applying a grip layer 716 to fiberglass layer 714. In some embodiments, grip layer 716 is substantially identical to high-friction layer 610 and is configured to enable firm contact between blanket 700 and the rollers and dancers of system 11. Subsequently, substrate 702 may be removed using any suitable technique, such as chemical etching.

Although the embodiments described herein mainly address blankets (ITMs) used in digital printing processes on sheets and web, the methods and systems described herein can also be used in other applications, such as in drum blanket used in indirect printing systems in which the blanket is wrapped around a drum and is not guided by rollers. The methods and systems described herein can also be used in any printing system using an ITM, such that the motion of the ITM is precisely controlled.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

Detecting and Compensating for Blanket Stretching

Figure 8:
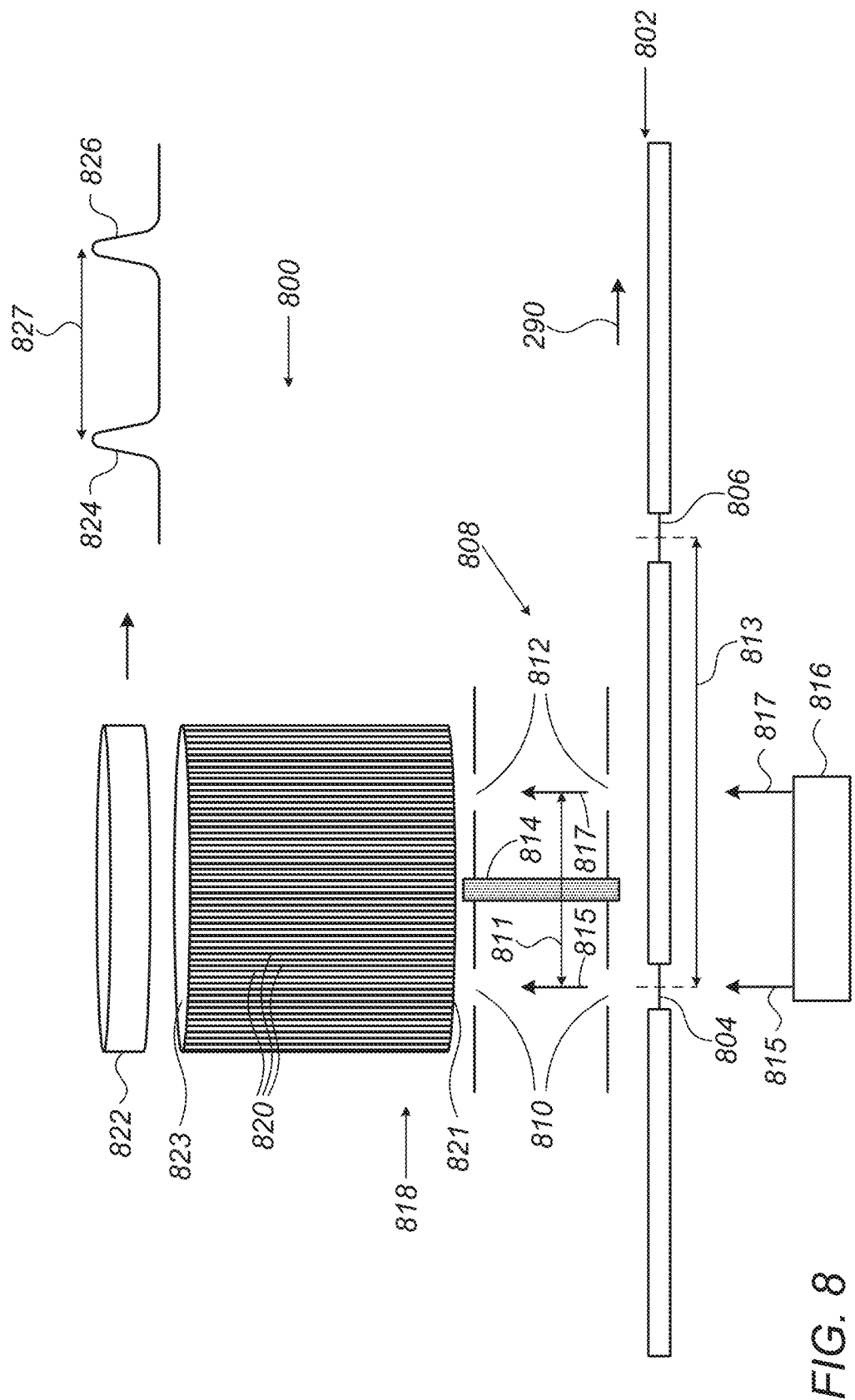
FIG. 8 is a schematic sectional view of a position sensing assembly, in accordance with another embodiment of the present invention.

FIG. 8 is a schematic sectional view of a position sensing assembly 800, in accordance with another embodiment of the present invention. In some embodiments, system 11 may comprise a blanket 802, which may replace, for example, blanket 210 of FIG. 1 above. As described, for example in FIGS. 2A-2C above, system 11 is configured to move blanket 802, at a predefined and controlled speed, in the moving direction represented by arrow 290.

In some embodiments, position sensing assembly 800 is configured to detect the position of markers, such as markers 804 and 806 that are engraved (or formed using any other suitable technique) in blanket 802 at a distance 813 from one another, and to produce signals indicative of stretching of blanket 802. As will be described in detail below, the disclosed techniques may obtain, for a given marker, two or more signals, indicative of two or more respective positions of the given marker. These techniques may be applied to multiple markers of the marked blanket, so as to estimate the actual length of distance 813, or in other words, to detect whether blanket 802 has been deformed, e.g., due to over-stretching.

In some embodiments, position sensing assembly 800 comprises a light source 816, such as one or more LEDs, one or more lasers or any other suitable type of light source, such as those described in detail in FIGS. 2A-2C and 3A-3C above. Light source 816 is configured to emit and direct multiple light beams, such as light beams 815 and 817, which may pass through markers 804 and 806 of blanket 802. Note that light beams 815 and 817 are typically identical to one another.

In some embodiments, position sensing assembly 800 comprises a slit assembly 808 having two or more slits 810 and 812, which are located at a distance 811 from one another and are adapted to respectively pass light beams 815 and 817 that have passed through markers 804 and 806 as described above. In some embodiments, distance 811 between slits 810 and 812 is smaller than distance 813 between markers 804 and 806, also referred to herein as an inter-marker distance. In some embodiments, slit assembly 808 comprises a shield 814, which is configured to block stray light or light scattered between slits 810 and 812. In other words, shield 814 is configured to isolate between light beams 815 and 817, so that each of light beams 815 and 817 is conveyed through position sensing assembly 800 in two separate channels, as will be described below.

In some embodiments, position sensing assembly 800 comprises a fiber assembly 818 having a bundle of multiple optical fibers 820 laid out between a lower surface 821 and an upper surface 823 of fiber assembly 818. In some embodiments, surfaces 821 and 823 are transparent to light beams 815 and 817, and optical fibers 820 are configured to convey light beams 815 and 817 through fiber assembly 818.

In some embodiments, position sensing assembly 800 comprises a sensor 822, such as but not limited to sensors 271 or 284 described in FIGS. 2A-2C above. Additionally or alternatively, sensor 822 may comprise a suitable type of a photodiode or any other suitable sensing apparatus, which is configured to sense light beams 815 and 817, and to produce electrical signals indicative of the intensity of the sensed light beams.

In the example embodiment of FIG. 8, system 11 moves blanket 802 at a predefined speed in the moving direction represented by arrow 290, and light source 816 emits light beams 815 and 817. When marker 804 is aligned with slit 810, light beam 815 passes through marker 804 and though slit 810 and fiber assembly 818, and is sensed by sensor 822, which outputs electrical signal 824, also referred to herein as a first signal, indicative of the sensed intensity of light beam 815 and of the first position of marker 804. Subsequently, system 11 keeps moving blanket 802 at the predefined speed in the direction of arrow 290. When marker 804 is aligned with slit 812, light beam 817 passes through marker 804 and though slit 812 and fiber assembly 818, and is sensed by sensor 822, which outputs electrical signal 826, also referred to herein as a second signal, indicative of the sensed intensity of light beam 817 and of the second position of marker 804.

Note that in the example configuration of FIG. 8, position sensing assembly 800 is configured to produce two signals indicative of two respective positions of a single marker (e.g., marker 804). In other embodiments, similar techniques may be implemented, mutatis mutandis, in other configurations, such that position sensing assembly 800 may be adapted to obtain any other suitable number of signals from a single marker.

In some embodiments, processor 20 receives electrical signals 824 and 826 and is configured to estimate, based on the predefined moving speed of blanket 802 and electrical signals 824 and 826, a distance 827, which is indicative of the distance marker 804 travelled between slits 810 and 812. Processor 20 is further configured to compare between estimated distance 827 and predefined distance 811 (between slits 810 and 812), so as to detect whether or not blanket 802 is deformed, e.g., due to stretching. For example, equal value of distances 811 and 827 may indicate that blanket 802 is not deformed or stretched, but when calculated distance 827 is larger than predefined distance 811, processor 20 is configured to alert that blanket 802 has been deformed due to excess tensile stress by system 11, or due to blanket aging or for any other reason.

In some embodiments, processor 20 may hold one or more thresholds for controlling and compensating for the stretching of blanket 802. For example, when distance 827 is larger than distance 811 by a value of a first threshold, processor 20 may display an alert of stretched blanket on display 34, moreover, processor 20 may adjust the moving speed of blanket 802, or other process parameters of system 11, so as to compensate for the blanket stretching. When distance 827 is larger than distance 811 by a second, larger threshold, processor may display a message to stop the operation of system 11 and/or may carry out any other suitable operation so as to compensate for the excess stretching of blanket 802.

This particular configuration of position sensing assembly 800 and marked blanket 802 are shown by way of example, in order to illustrate certain problems, such as blanket stretching, which are addressed by embodiments of the present invention and to demonstrate the application of these embodiments in enhancing the performance of a digital printing system, such as system 11. Embodiments of the present invention, however, are by no means limited to this specific sort of example system, and the principles described herein may similarly be applied to other sorts of position sensing assemblies and/or blankets and/or printing systems.

The invention claimed is:

1. A method for operating a system comprising (i) a flexible intermediate transfer member (ITM) having a stack of multiple layers and one or more markers engraved in at least one of the layers, at one or more respective marking locations along the ITM, (ii) one or more sensing assemblies disposed at one or more respective predefined locations relative to the ITM, for producing signals indicative of respective positions of the markers, (iii) one or more light sources associated respectively with at least one of the sensing assemblies, such that each light source is facing the respective sensing assembly or coupled to the respective sensor, wherein each of the light sources is for illuminating the ITM, and (iv) a slit assembly, which is disposed between the ITM and the sensing assembly and having first and second slits, which are formed at a predefined distance from one another for passing, through the slit assembly, one or more light beams emitted from the light source, the method comprising:
   moving the ITM for receiving ink droplets from an ink supply system to form an ink image on the ITM, and transferring the ink image from the ITM to a target substrate;
   producing (i) a first signal when a given marker of the markers is aligned with the first slit, and (ii) a second signal when the given marker is aligned with the second slit, wherein the first signal is indicative of a position of the given marker aligned with the first slit, and the second signal is indicative of the position of the given marker aligned with the second slit;
   controlling a deposition of the ink droplets on the ITM based on the first and second signals; and
   detecting a deformation of the ITM based on the first and second signals.

2. The method according to claim 1, wherein at least one of the markers comprises at least one code selected from a list consisting of: a grid marker, a motion encoding code, a one-dimensional (1D) barcode, a two-dimensional (2D) barcode, and a three-dimensional (3D) barcode.

3. The method according to claim 1, wherein moving the ITM for receiving ink droplets comprises moving the ITM at a predefined speed relative to the first and second slits, and detecting the deformation of the ITM, based on the predefined speed and the first and second signals.

4. The method according to claim 1, wherein the system comprises at least one station or assembly, and the method comprises controlling, based on the signals, an operation of the at least one station or assembly of the system.

5. The method according to claim 4, wherein the at least one station or assembly is selected from a list consisting of (a) an image forming station, (b) an impression station, (c) an ITM guiding system, (d) one or more drying assemblies, (e) an ITM treatment station, and (f) an image quality control station.

6. The method according to claim 5, wherein the impression station comprises a rotatable impression cylinder and a rotatable pressure cylinder, for transferring the ink image to the target substrate, and wherein controlling the operation based on the signals comprises controlling at least one operation selected from a list consisting of (a) timing of engagement and disengagement between the impression and pressure cylinders, (b) a motion profile of at least one of the impression and pressure cylinders, and (c) a size of a gap between the disengaged impression and pressure cylinders.

7. The method according to claim 5, wherein controlling the operation based on the signals comprises controlling at least one of: (a) a drying process applied by at least one of the drying assemblies for drying the ink droplets deposited on the ITM, (b) a velocity of one or more rollers of the ITM guiding system, (c) at least one of a cooling process, a cleaning process and a treatment process of the ITM at the ITM treatment station, or (d) at least one imaging parameter of a digital image of the ink image acquired and processed by the image quality control station.

8. The method according to claim 1, wherein the one or more markers comprises a continuous marker formed along at least a portion of the ITM.

9. The method according to claim 1, wherein at least one of the markers engraved in the ITM comprises filling material for filling at least part of a structure formed in at least one of the ITM layers.

10. The method according to claim 9, wherein producing at least one of the first and second signals is based on a change caused by the filling material in one or both of: (i) at least one optical property of at least one of the ITM layers, and (ii) at least one optical property of the entire ITM.

* * * * *